United States Patent [19]

Tatsumi

[11] Patent Number: 5,481,745
[45] Date of Patent: Jan. 2, 1996

[54] HIGH SPEED DIVIDER FOR PERFORMING HEXADECIMAL DIVISION HAVING CONTROL CIRCUIT FOR GENERATING DIFFERENT DIVISION CYCLE SIGNALS TO CONTROL CIRCUIT IN PERFORMING SPECIFIC FUNCTIONS

[75] Inventor: Takashi Tatsumi, Itami, Japan

[73] Assignee: Mitsubishi Denki Kabushiki Kaisha, Tokyo, Japan

[21] Appl. No.: 172,337

[22] Filed: Dec. 23, 1993

[30] Foreign Application Priority Data

Dec. 25, 1992 [JP] Japan ................................. 4-346440

[51] Int. Cl.⁶ ............................... G06F 7/38; G06F 7/52
[52] U.S. Cl. ...................... 395/800; 395/375; 364/761; 364/748; 364/937.3; 364/258.3; 364/259.5; 364/DIG. 1
[58] Field of Search ................................. 395/800, 375, 395/200; 364/745, 748, 764, 766, 767, 761, DIG. 1, DIG. 2

[56] References Cited

U.S. PATENT DOCUMENTS

| 4,707,798 | 11/1987 | Nakano ................................. 364/765 |
| 4,760,550 | 7/1988 | Katzman et al. ...................... 364/748 |
| 4,839,846 | 6/1989 | Hirose et al. ......................... 364/748 |
| 5,097,435 | 3/1992 | Takahashi ............................. 364/766 |
| 5,258,944 | 11/1993 | Smith .................................. 364/748 |
| 5,267,186 | 11/1993 | Gupta et al. ........................ 364/748 |
| 5,309,383 | 5/1994 | Kuroiwa ............................... 364/748 |

FOREIGN PATENT DOCUMENTS 1-125625 of 1989 Japan.

Primary Examiner—Meng-Ai An
Attorney, Agent, or Firm—Lowe, Price, LeBlanc & Becker

[57] ABSTRACT

A divider comprising a first and second normalizing circuits (5, 6) each which holds a hexadecimal-normalized mantissa data of a dividend and divisor respectively, a selector (7) which inputs the mantissa outputted from the first normalizing circuit (5), a remainder data outputted from a latch (13), a borrow signal (16) of a subtracter (8) which subtracts the mantissa data of the divisor from the mantissa of the dividend data of the remainder data, and control signals 21, 22, 23 respectively indicating a first, second and third and after third division cycles, through-outputs the mantissa data of the dividend in the first division cycle, shifts the mantissa data outputted from the first normalizing circuit (5) to the right by three bits and outputs it when the borrow signal (16) indicates "0" in the second division cycle, shifts the mantissa data outputted from the first normalizing circuit (5) to the left by one bit when the borrow signal (16) indicates "1", and through-outputs the remainder data outputted from the latch (13) in the third division cycle, and a dividing circuit. (100) which calculates a quotient data and a remainder data by using data outputted from the selector (7) and the mantissa data outputted from the second normalizing circuit (6).

6 Claims, 19 Drawing Sheets

HIGH SPEED DIVIDER FOR PERFORMING HEXADECIMAL DIVISION HAVING CONTROL CIRCUIT FOR GENERATING DIFFERENT DIVISION CYCLE SIGNALS TO CONTROL CIRCUIT IN PERFORMING SPECIFIC FUNCTIONS

BACKGROUND OF THE INVENTION

1. Field of the Invention

The present invention relates to a divider, particularly to a floating point divider carrying out division of floating point data whose base is 16 (hereinafter to be called hexadecimal division).

2. Description of the Related Art

FIG. 1 is a block diagram showing a configuration of one example of a conventional divider which carries out hexadecimal division. In addition, FIG. 1 is a block diagram of a divider shown in the FIG. 1 of Japanese Patent Application Laid-Open No. 1-125625 (1988).

In the conventional divider, at first, a mantissa of a dividend being floating point data whose base is 16 is inputted from the outside through a signal line 170 and set in a register 151. The upper three bits set in the register 151 are sent to an encoder 152 through a signal line 171, and the number of leading zero is detected there, the number of leading zero is held in a register 153 through a signal line 172. The number of leading zero is also sent to a shifter 158 as a shift number by the fact that a selector 156 selects the signal line 172 corresponding to a signal outputted by a control circuit 160 to a signal line 180.

On the other land, by the fact that a selector 157 selects an input line 176 corresponding to a signal outputted by the control circuit 160 to a signal line 183, and the control circuit 160 outputs a signal to a signal line 181 to direct the shifter 158 to shift to the left direction, the shifter 158 shifts the output (a mantissa of a dividend) of the register 151 to the left by the number of leading zero. A dividend which has been normalized such a way with the base being 2 (hereinafter to be called binary normalization) is held in a dividend register (not shown) inside of a convergence binary dividing circuit 159.

Next, the mantissa of divisor being floating point data whose base is 16 is inputted from the outside through a signal line 170 and set in the register 151. In case of a divisor, the same operation as the case of a dividend is performed except that the number of leading zero is held in a register 154 and that a divisor which has been binary-normalized is held in a divisor register (not shown) inside of the convergence binary dividing circuit 159. Thereafter, by a direction given from the control circuit 160 through a signal line 182, the convergence binary dividing circuit 159 performs a convergence division with the base being 2.

The result of division is outputted in the binary-normalized data from the convergence binary dividing circuit 159 to a signal line 179, however, the bits thereof have been shifted by the left shifting performed at binary normalizing of the division and the dividend. And since the radix point is shifted by the convergence division from the position at which the base is 16, a compensation shift is required. The compensation shift quantity therefor can be obtained by calculating the output of the register 153 and the output of the register 154 at an arithmetic circuit 155. As a result of this operation, when a carry out (signal line 175) becomes "0", by the fact that the selector 156 selects a signal line 173 corresponding to a signal outputted to the signal line 180 by the control circuit 160, the output of the arithmetic circuit 155 is sent to the shifter 158 through a signal line 174, and further a selector 157 selects the signal line 179 corresponding to a signal outputted to the signal line 183 by the control circuit 160. Thereby, the division result of the output of the dividing circuit 159 is outputted after the mantissa and exponent of the division result is compensated by the shifter 158 on the basis of the compensation shift quantity calculated by the arithmetic circuit 155 to be normalized with the base being 16 (hereinafter to be called hexadecimal normalization), from the shifter 158 as output data.

In the aforesaid conventional example, a convergence division method is used as a division algorithm, however, when other algorithm such as a restoring method or a non restoring method is used, mantissa data of a divisor and a dividend is binary-normalized before division, shift quantity at binary normalizing is held, mantissa data of division result is hexadecimal-normalized after executing division, and an exponent is calculated from the shift quantity at hexadecimal-normalizing and the binary-normalizing shift quantity which has been held, in the same way as the convergence division method, thereby to obtain a division result.

In the aforesaid conventional divider which performs hexadecimal division, since mantissa data of a divisor and dividend with the base being 16 is binary-normalized and is divided after that, and after executing division, the division result outputted in the binary-normalized form is hexadecimal-normalized, not only a medium called a binary normalization shift is required but means for compensating bit shift caused at binary normalizing shift as well, therefore there are problems that the processings are complicated and the operation takes a lot of time. There also is a problem that the number of hardwares is increased since whole bits of mantissa data must be shifted to perform binary-normalizing shift a register for holding the binary-normalizing shift quantity and hexadecimal-normalizing shift quantity must be provided in order to compensate bit shift of the division result to obtain a proper exponent data.

SUMMARY OF THE INVENTION

The present invent, ion has been devised in order to solve such problems as aforementioned, and the object thereof is to provide a divider which can perform a division with a dividend and al divisor being hexadecimal numbers and as a result which does not have to perform binary normalizing shift, does not have to hold binary normalizing shift quantity at the lime of obtaining exponent data, and can calculate at high speed with less number of hardwares.

The divider of the present invention is constructed as to align digits of a hexadecimal-normalized dividend in advance by selectively using a left shifting function and a right shifting function built in a selector, and then to determine hexadecimal division result by repeating processings by predetermining number of times.

A first invention of a divider related to the invention is provided with a first normalizing circuit for inputting data of a dividend being floating point data whose base is 16 and normalizing it on the basis of the aforesaid base, a second normalizing circuit for inputting data of a divisor being floating point data whose base is 16 and normalizing it on the basis of the aforesaid base, a dividing circuit, and a selector for inputting a mantissa data of the dividend from the first normalizing circuit, remainder data from the dividing circuit and a division cycle signal showing a division cycle, and when the division cycle signal shows a first cycle, through-outputting the mantissa data of the dividend intact, when the division cycle signal shows a second cycle and the mantissa data of the dividend is equal to or larger than that of the divisor, shifting the mantissa data of the dividend to the right and outputting it, when the division cycle signal shows a second cycle and the mantissa data of the dividend is smaller than that of the divisor, shifting the mantissa data of the dividend to the left and outputting it, and when the division cycle signal shows third and after third cycles, through-outputting the remainder data intact, whereby the dividing circuit calculates the quotient data and remainder data from the data outputted by the selector and the mantissa data of the dividend outputted by the second normalizing circuit.

According to a second invention of a divider related to the invention, the left shifter in the dividing circuit is commonly used in place of the left shifter required in the selector in the first invention by the fact that the selector of a divider related to the invention is constructed such that, when the division cycle signal shows a first cycle, it through-outputs mantissa data of a dividend, when the division cycle signal shows a second cycle and the mantissa data of the dividend is equal or larger than that of a divisor, it shifts the mantissa data of the dividend to the fright and outputs it, and when the division cycle signal shows a second cycle and the mantissa data of the dividend is smaller than that of the divisor or when the division cycle signal shows third and after third cycles, it throughoutputs remainder data.

And according to the third invention of a divider related to the invention, the divider of the aforesaid first invention is constructed such that is performs division of binary notated decimal numbers and obtains the resultant data in binary notated decimal numbers.

The above and further objects and features of the invention will more fully be apparent from the following detailed description with accompanying drawings.

DESCRIPTION OF THE PREFERRED EMBODIMENTS

In the following, explanation will be made in detail on the present invention referring to drawings showing the embodiments thereof.

[First Embodiment]

Figure 1:
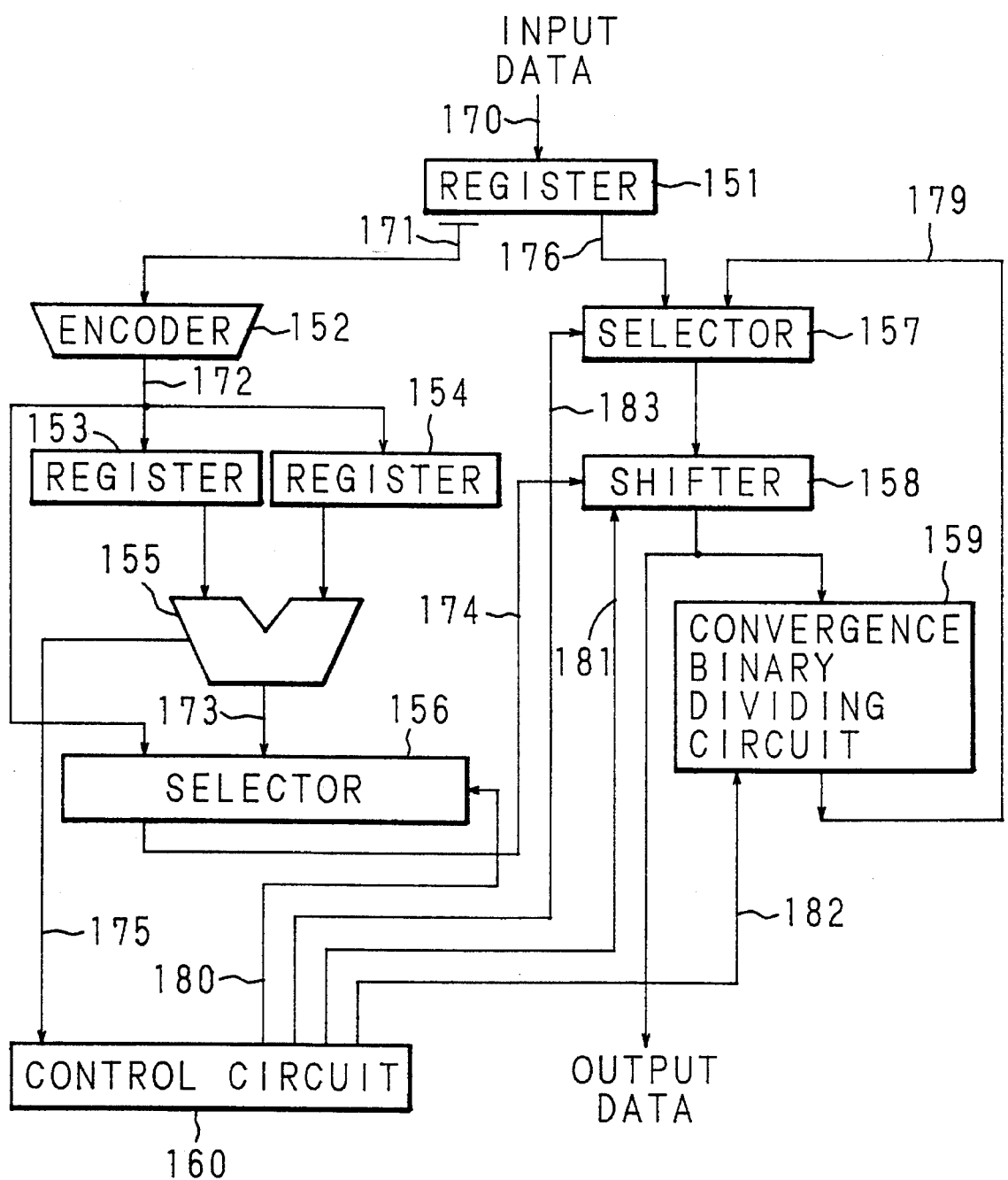
FIG. 1 is a block diagram showing a configuration example of a conventional divider.
Figure 2:
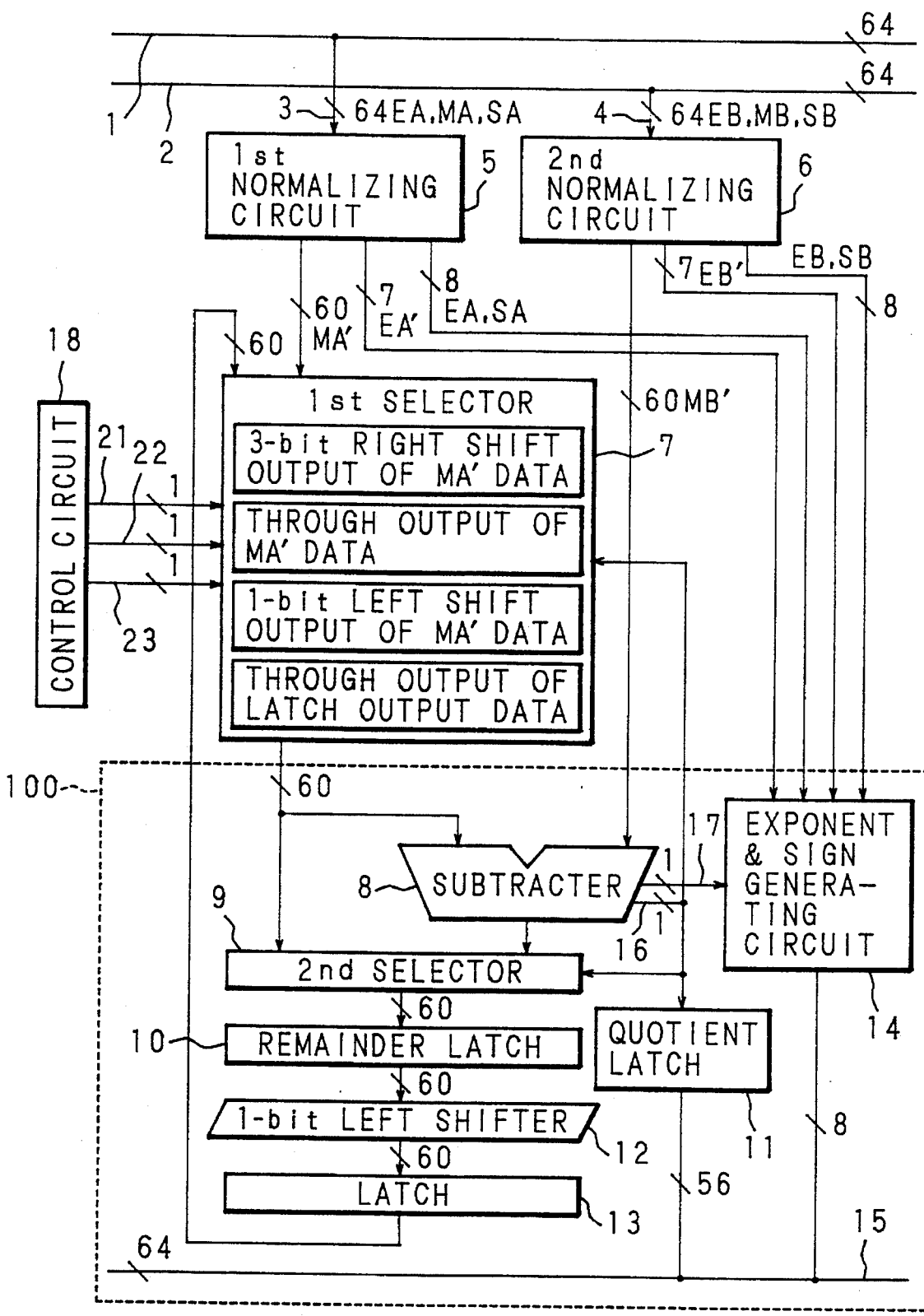
FIG. 2 is a block diagram showing a configuration example of an embodiment of a first invention of a divider of the invention, FIG. 3(a) and (b) are flow charts showing an operation procedure of a first invention of a divider of the invention.

FIG. 2 is a block diagram showing a configuration example of a first invention of a divider of the invention of the case where division is executed with floating point data of 64 bits.

In FIG. 2, reference numeral 1 designates an input bus for floating point data of a dividend, and numeral 2 designates an input bus for floating point data of a divisor.

In addition, floating point data of a dividend is the data whose base is 16 and which is composed of an exponent data of 7 bits (hereinafter to be called an EA), a mantissa data of 56 bits (hereinafter to be called an MA), and a sign data of 1 bit (hereinafter to be called an SA). And floating point, data of a divisor is the data whose base is 16 and which is composed of an exponent data of 7 bits (hereinafter to be called an EB), a mantissa data of 56 bits (hereinafter to be called an MB), and a sign bit of 1 bit (hereinafter to be called an SB).

Reference numeral 5 designates a hexadecimal normalizing circuit (hereinafter to be called a first normalizing circuit) for a dividend connected with an input bus 1 by a path 3, and the circuit 5 inputs the floating point data of a dividend from the input bus 1. The outputs from the first normalizing circuit 5, description thereof will be made later however, are data of 8 bits obtained by concatenating the exponent data EA of 7 bits and the sign data SA of 1 bit together, the mantissa data MA' of 60 bits generated from the mantissa data MA of 56 bits, and the normalizing shift quantity EA' of 7 bits at hexadecimal normalizing.

Reference numeral 6 designates a hexadecimal normalizing circuit (hereinafter to be called a second normalizing circuit) for a divisor connected with an input bus 2 with a path 4, and the circuit 6 inputs floating point data of a divisor from the input bus 2. The outputs from the second normalizing circuit 6, the description thereof will be made later however, are data of 8 bits obtained by concatenating the exponent data EB of 7 bits and the sign data SB of 1 bit together, the mantissa data MB' of 60 bits generated from the mantissa data MB of 56 bits, and the normalizing shift quantity data EB' of 7 bits at hexadecimal normalizing.

Reference numeral 7 designates a first selector. The first selector 7 selects either the mantissa data (hereinafter to be called an MA') of 60 bits of a dividend which is an output of the first normalizing circuit 5 or a remainder data which is an output from the dividing circuit 100 to be described later, according to the control signals (division cycle signals) 21, 22, 23 given from the control circuit 18 and outputs it to a second selector 9 and a subtracter 8 inside of the dividing circuit 100.

The subtracter 8 inputs the output of the first selector 7 and the mantissa data (hereinafter to be called an MB') of 60 bits of a divisor which is an output from the second normalizing circuit 6 and subtracts the latter from the former, and outputs a control signal 16 indicating negative or non-negative of the subtraction result and an exponent increment signal 17.

The second selector 9 inputs the mantissa data which is the output from the first selector 7 and the subtraction result which is the output of the subtracter 8, and selects either of them on the basis of the control signal 16 and outputs it to a remainder latch 10. The remainder latch 10 latches the output of the second selector 9.

Numeral 11 designates a quotient latch which generates a quotient from the subtraction result of the subtracter 8 and latches it with shifting.

Numeral 12 designates a 1-bit left shifter which shifts data outputted from the remainder latch 10 by one bit to the left, and numeral 13 designates a latch which latches the output of the 1-bit left shifter 12.

Reference numeral 14 designates an exponent and sign generating circuit which performs operation of exponents and generates sign, to which the exponent increment signal 17 of 1 bit is inputted from the subtracter 8, and the normalizing shift quantity data of 7 bits of a dividend and data of 8 bits obtained by concatenating the exponent data EA of 7 bits and the sign data SA of 1 bit together are inputted from the first normalizing circuit 5, and further the normalization shift quantity data of 7 bits of a divisor and data of 8 bits obtained by concatenating the exponent data EB of 7 bits and the sign data SB of 1 bit together are inputted from the second normalizing circuit 6.

Numeral 15 designates an output bus for floating point data of 64 bits of the quotient.

Numeral 18 designates a control circuit of a divider for outputting the control signals 21, 22, 23 which are the division cycle signals for indicating division cycles to control the first selector 7 corresponding to the respective division cycles. In addition, the control signal 21 generated by the control circuit 18 indicates a first division cycle, the control signal 22 a second division cycle, and the control signal 23 third and after third division cycles.

And a portion including the subtracter 8, second selector 9, remainder latch 10, quotient latch 11, 1-bit left shifter 12, latch 13 and exponent and sign generating circuit 14 surrounded by a broken line in FIG. 2 is called a dividing circuit 100 in a divider of the present invention.

Next, explanation will be made on the operation of the first invention of the present invention having such a configuration as shown in FIG. 2 above shown, referring to a flow chart of FIG. 3(*a*) and FIG. 3(*b*) showing the operation procedure and to a timing chart of FIG. 4.

Generally, the operation of a divider has cycles, and the selection of data by the first selector 7 depends upon the fact that in which cycle the divider is operated. At the first selector 7, the division cycle is always known by the control signals 21, 22, 23 generated from the control circuit 18.

Figure 3A:
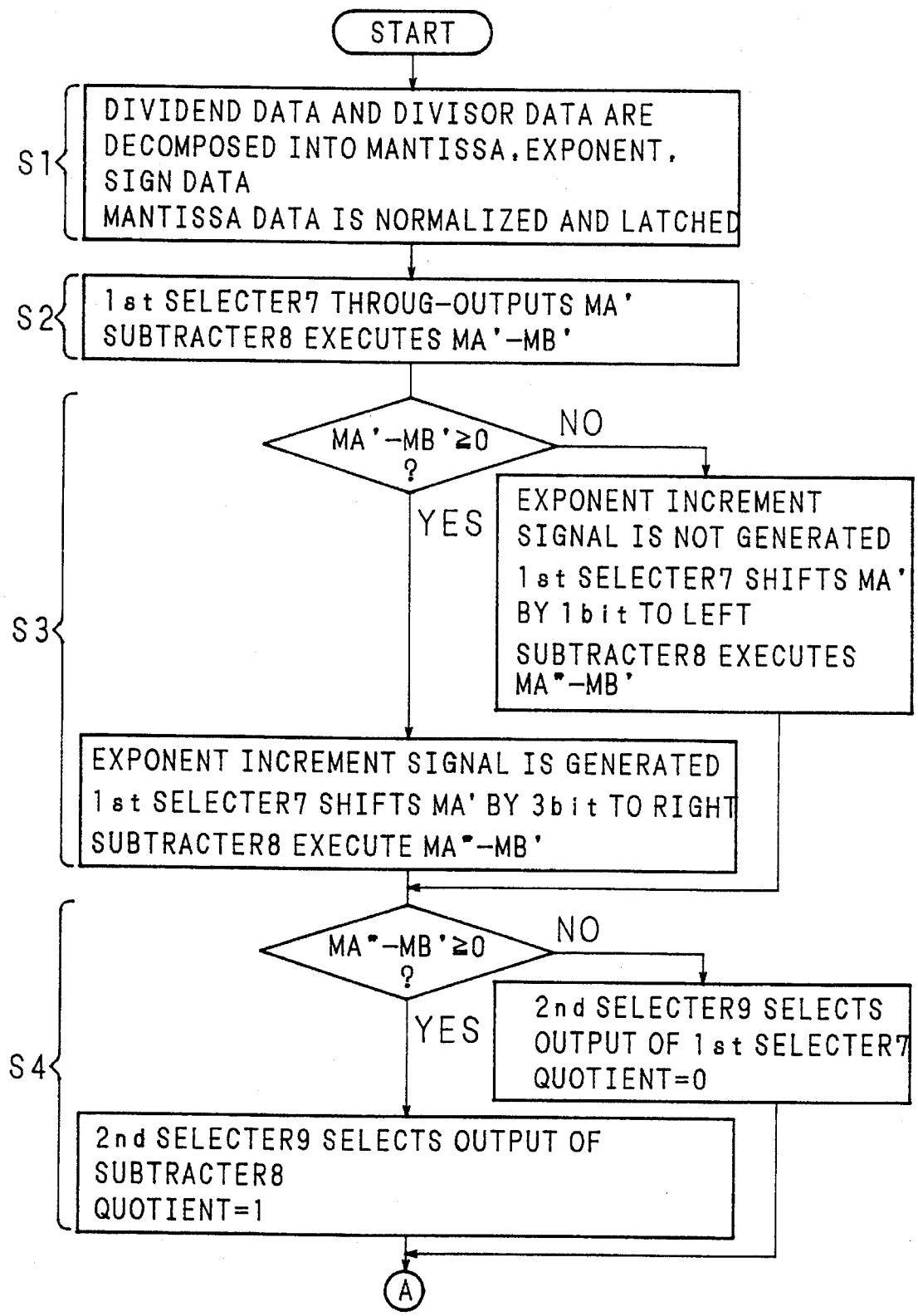
Figure 3B:
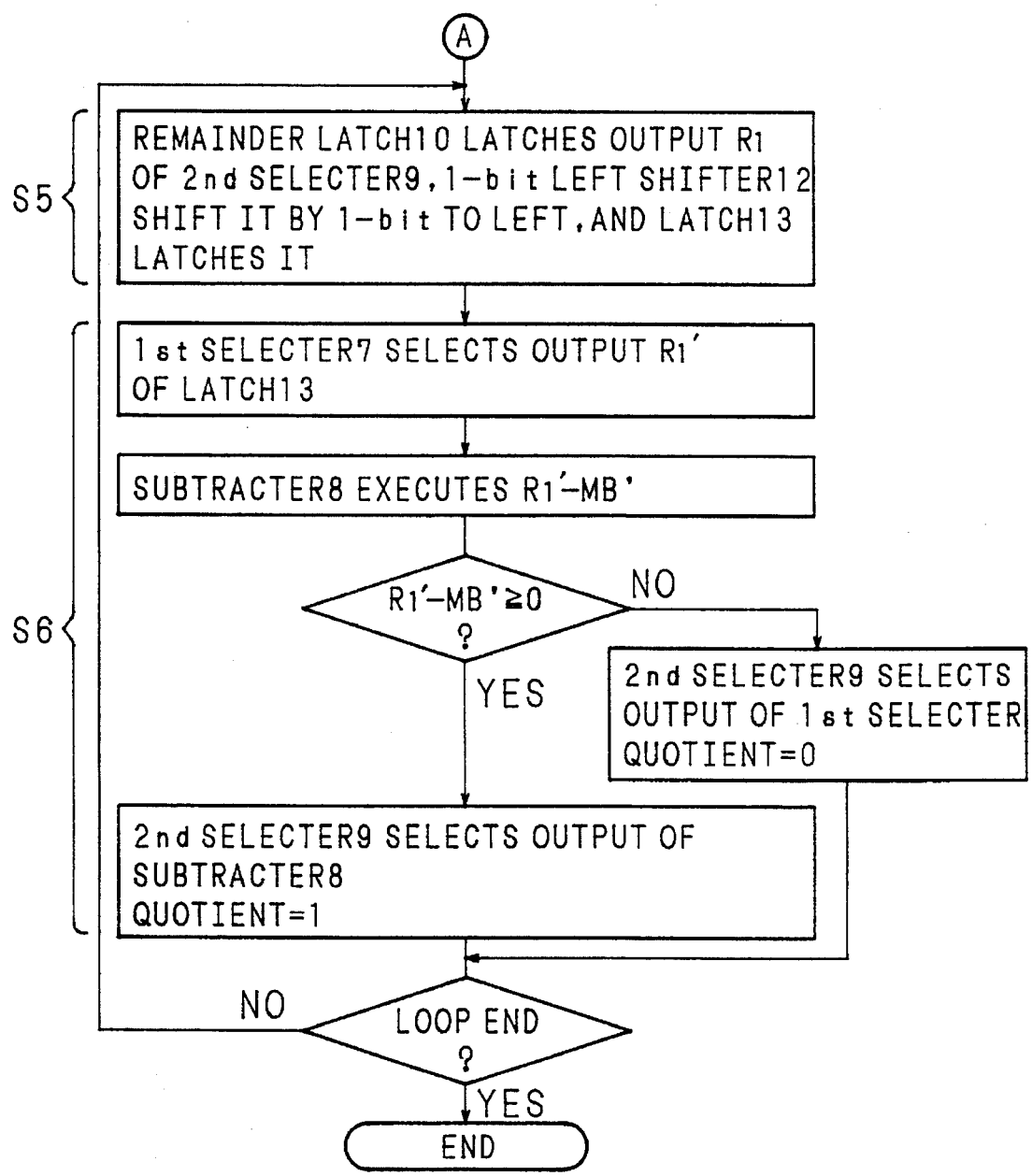
Figure 4:
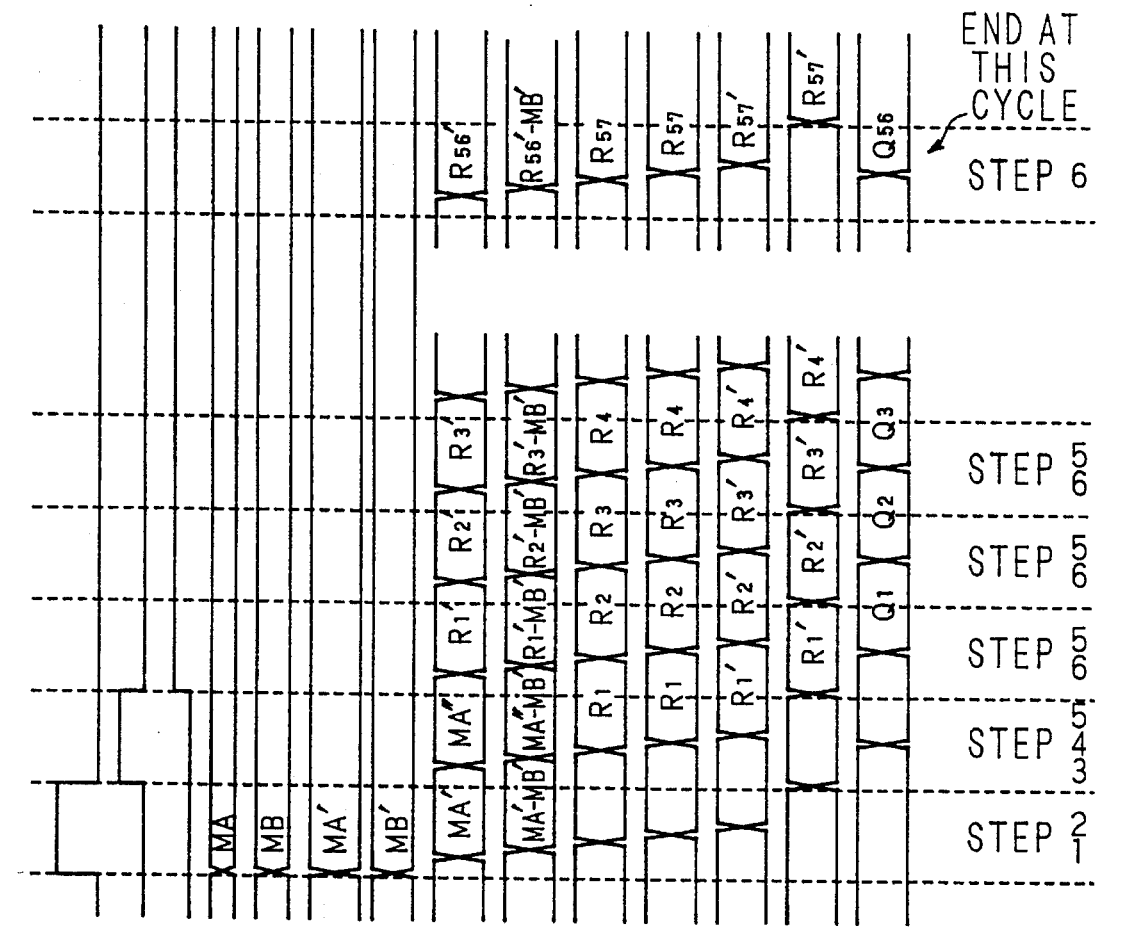
FIG. 4 is a timing chart showing an operation timing of a first invention of a divider of the invention.

As first cycle processings, processings from step 1 to step 2 shown in FIG. 3 are performed.

<Step 1>

At first, floating point data of 64 bits of a dividend is inputted to the first, normalizing circuit 5 for a dividend from the input bus 1 through the path 3, and is decomposed into the exponent data EA of 7 bits, the mantissa data MA of 56 bits, and the sign data SA of 1 bit.

The exponent data EA of 7 bits and the sign data SA of one bit are latched at the first normalizing circuit 5, and data of 8 bits obtained by concatenating together the above two data is transmitted to the exponent and sign generating circuit 14. In addition to hexadecimal normalization, the mantissa data MA of 56 bits is zero-expanded at its upper one bit and the lower three bits to be the mantissa data MA' of 60 bits and is latched at the first normalizing circuit 5 and transmitted to the first selector 7 as well. And the normalizing shift quantity data EA' of 7 bits at hexadecimal normalizing at the first normalizing circuit 5 is latched at the first normalizing circuit 5 and transmitted to the exponent and sign generating circuit 14 as well.

On the other hand, the floating point data of 64 bits of a divisor is inputted to the second normalizing circuit 6 for a divisor from the input bus 2 through the path 4, and is decomposed into the exponent data EB of 7 bits, the mantissa data MB of 56 bits, and the sign data SB of 1 bit.

The exponent data EB of 7 bits and the sign data SB of 1 bit are latched at the second normalizing circuit. 6, and data of 8 bits obtained by concatenating together the above two data is transmitted to the exponent and sign generating circuit 14. In addition to hexadecimal normalization, the mantissa data MB of 56 bits is zero-extended at its upper one bit and the lower three bits to be the mantissa data MB' of 60 bits and is latched at the second normalizing circuit 6 and transmitted to the subtracter 8. And the normalizing shift quantity data EB' of 7 bits at hexadecimal normalizing at the second normalizing circuit 6 is latched at the second normalizing circuit 6 and is transmitted to the exponent and sign generating circuit 14 as well.

The reason to zero-extend the upper one bit and lower three bits of the mantissa data MA and MB of 56 bits of the dividend and the divisor is that a bit width obtained by adding four bits to a bit width of a mantissa is necessary in performing right shifting by three bits or left shifting by one bit at the first selector 7, and the detailed description will be made later.

<Step 2>

In the first cycle, the mantissa data MA' of 60 bits of a dividend transmitted from the first normalizing circuit 5 to the first selector 7 is transmitted intact from the first selector 7 to the subtracter 8 without changing the value of data. The subtracter 8 performs subtraction MA'−MB' by making use of mantissa data MA' of 60 bits of a dividend transmitted from the first selector 7 and the mantissa data MB' of 60 bits of a divisor transmitted from the second normalizing circuit 6, thereby judges which is larger. The result of the comparison, that is, negative or non-negative of the subtraction result is transmitted to the first selector 7 as a control signal 16 of one bit.

In the second cycle, processings from step 3 to step 5 shown in FIG. 3 are performed on the basis of the result of the first cycle.

<Step 3>

In step 3, converted output data of the mantissa data MA' of 60 bits of a dividend by the first selector 7 is called MA".

When the control signal 16 transmitted from the subtracter 8 to the first selector 7 is "0", that is, when MA'≧MB' is represented, the first selector 7 shifts the mantissa data MA' of 60 bits of a dividend to the right by three bits, and transmits the mantissa data MA" of 60 bits at whose upper three bits, "0" is extended, to the subtracter 8 and the second selector 9. In this case, the subtracter 8 generates the exponent increment signal 17 of one bit and transmits it to the exponent and sign generating circuit 14.

On the other hand, when the control signal 16 transmitted from the subtracter 8 to the first selector 7 is "1", that is, when MA'<MB' is represented, the first selector 7 shifts the mantissa data MA' of 60 bits of a dividend to the left by one bit and transmits the mantissa data MA" of 60 bits at whose lower one bit, "0" is extended, to the subtracter 8 and the second selector 9. In this case, the subtracter 8 does not generate the exponent increment signal 17.

The subtracter 8 performs subtraction MA"–MB' by making use of the mantissa data MA" of 60 bits of a dividend and the mantissa data MB' of 60 bits of a divisor which has been transmitted, and transmits the subtraction result (MA"–MB') of 60 bits to the second selector 9 and the control signal 16 of one bit indicating negative or non-negative of the subtraction result to the quotient latch 11, the first selector 7 and the second selector 9.

<Step 4>

In step 4, remainder data of 60 bits selectively outputted by the second selector 9 is called $R_1$, and a generated quotient of one bit is called $Q_1$.

When the control signal 16 transmitte from the subtracter 8 to the second selector 9 is "0", that is, when MA">MB' is represented, since the second selector 9 selects the subtraction result (MA"–MB') of 60 bits transmitted from the subtracter 8, the remainder data $R_1$ becomes as $R_1$=MA"–MB'. In this case, the quotient latch 11 generates the quotient $Q_1$=1 of one bit according to the transmitted control signal 16 and latches it.

On the other hand, when the control signal 16 transmitted from the subtracter 8 to the second selector 9 is "1", that is, when MA"<MB' is represented, since the second selector 9 selects the mantissa data MA" of 60 bits of a dividend transmitted from the first selector 7, the remainder data $R_1$ becomes as $R_1$=MA". In this case, the quotient latch 11 generates the quotient $Q_1$=0 of one bit according to the transmitted control signal 16 and latches it.

<Step 5>

The remainder data $R_1$ of 60 bits selected by the second selector 9 is transmitted to the remainder latch 10 and latched. The remainder data $R_1$ of 60 bits latched by the remainder latch 10 is shifted to the left by one bit by the 1-bit left shifter 12, then is zero-extended at its lower one bit (hereinafter to be called R1') and latched by the latch 13.

In the third cycle, processings from step 6 and step 5 shown in FIG. 3 are performed.

<Step 6>

In step 6, remainder data of 60 bits selectively outputted by the second selector 9 is called $R_2$, and a generated quotient of one bit is called $Q_2$.

The first selector 7 selects the remainder data $R_1$' of 60 bits latched by the latch 13 and transmits it to the subtracter 8 and the second selector 9. The subtracter 8 performs subtraction $R_1$'–MB' by making use of the remainder data $R_1$' of 60 bits transmitted from the first selector 7 and the mantissa data MB' of 60 bits of a divisor transmitted from the second normalizing circuit 6, and transmits the subtraction result ($R_1$'–MB') of 60 bits to the second selector 9 and the control signal 16 of one bit indicating negative or non negative of the subtraction result to the quotient latch 11, the first selector 7 and the second selector 9.

When the control signal 16 transmitted from the subtracter 8 to the second selector 9 is "0", that is, when $R_1$'≧MB' is represented, since the second selector 9 selects the subtraction result ($R_1$'–MB') of 60 bits transmitted from the subtracter 8, the remainder data $R_2$ becomes as $R_2$=$R_1$'–MB'. In this case, the quotient latch 11 generates the quotient $Q_2$=1 of one bit according to the transmitted control signal 16, and shifts data of itself to the left by one bit, then latches it to the LSB.

On the other hand, when the control signal 16 transmitted from the subtracter 8 to the second selector 9 is "1", that is, when $R_1$'<MB' is represented, since the second selector 9 select the remainder data $R_1$' of 60 bits transmitted from the first selector 7, the remainder data $R_2$ becomes as $R_2$=$R_1$'. In this case, the quotient latch 11 generates the one bit quotient $Q_2$=0 according to the transmitted control signal 16, and shifts data of itself to the left by one bit, then latches it to the LSB.

<Step 5>

The remainder data $R_2$ of 60 bits selected by the second selector 9 is transmitted to the remainder latch 10 and latched. The remainder data $R_2$ of 60 bits latched by the remainder latch 10 is shifted to the left by one bit by the 1-bit left shifter 12, then is zero-extended at its lower one bit (hereinafter to be called $R_2$'), and latched by the latch 13.

By repeating the aforesaid processings of the third cycle by "the bit number of the mantissa–1" times, mantissa data of a quotient of bit number equal to that of mantissa, that is, 56 bits is determined, and is latched at the quotient latch 11 in the state of being hexadecimal-normalized.

And exponent data of 7 bits of a quotient is determined as follows. At first, in the exponent and sign generating circuit 14, exponent operations of EA–EA'–EB+EB' and EA–EA'–EB+EB'+1 are performed among the exponent data EA of 7 bits and the normalizing shift quantity data EA' of 7 bits of a dividend transmitted from the first normalizing circuit 5, and the exponent data EB of 7 bits and the normalizing shift quantity data EB' of 7 bits of a divisor transmitted from the second normalizing circuit 6. And the exponent and sign generating circuit 14 makes the operation result of EA–EA'–EB+EB' be exponent data of a quotient when the exponent increment signal 17 is not transmitted from the subtracter 8, and makes the operation result of EA–EA'–EB+EB'+1 be exponent data of a quotient, when the exponent increment signal 17 is transmitted from the subtracter 8.

One bit sign data of a quotient is generated at the exponent and sign generating circuit 14 from the exclusive OR operation between the sign data SA of a dividend transmitted from the first normalizing circuit 5 and the sign data SB of a divisor transmitted from the second normalizing circuit 6.

After the operation, mantissa data of 56 bits of a quotient is outputted from the quotient latch 11 to the output bus 15, and exponent and sign data of 8 bits is outputted from the exponent and sign generating circuit 14 to the output bus 15.

Next, explanation will be given on the first selector 7 of the first invention of a divider of the invention.

Figure 5:
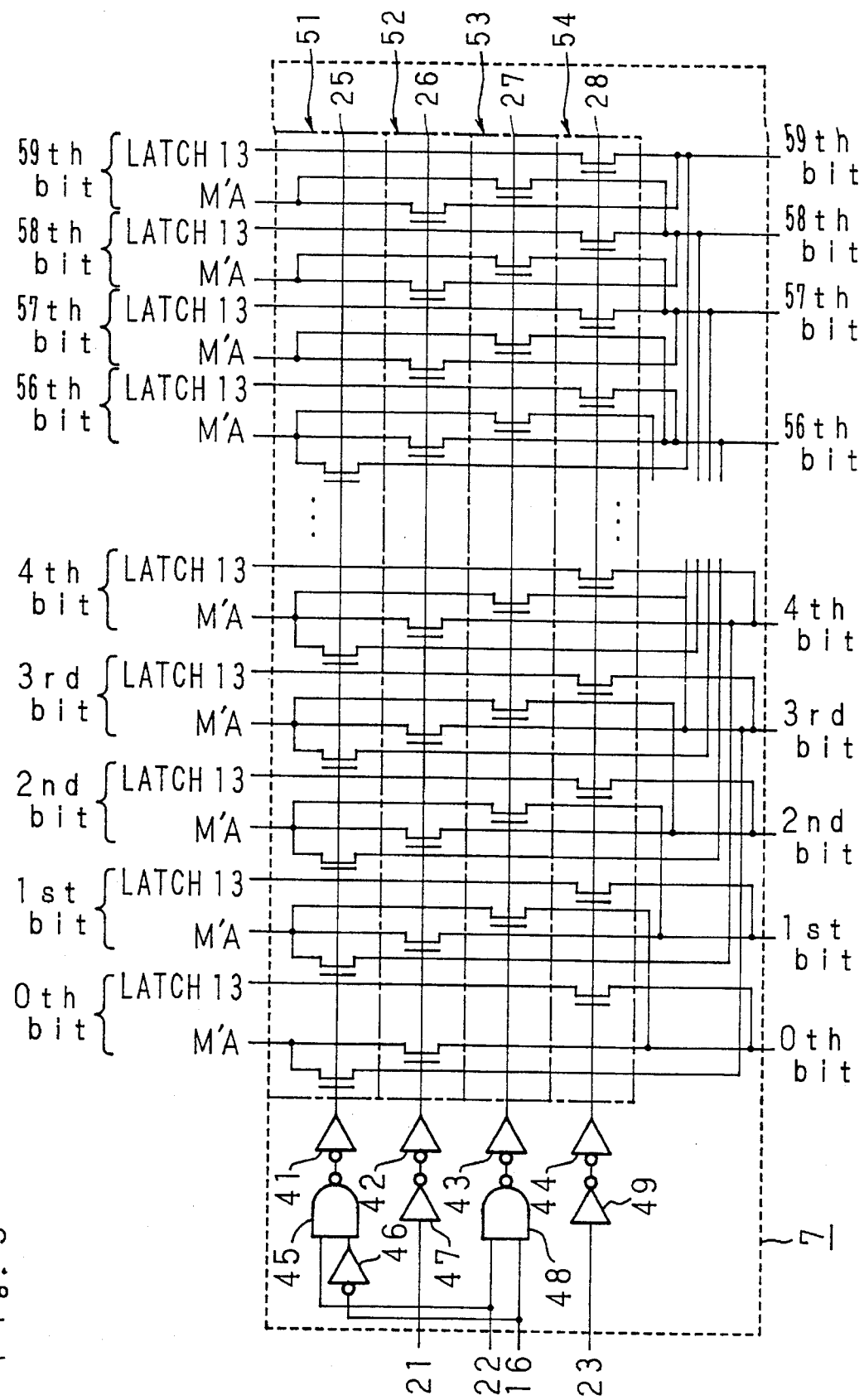
FIG. 5 is a circuit diagram showing a configuration example of a first selector of a first invention of a divider of the invention.

FIG. 5 is a circuit diagram showing a concrete configuration example of the first selector 7 of the first invention of a divider of the invention.

The first selector 7 has an input of 60 bits and an output of 60 bits, and performs either of the operation of outputting (through output) intact the mantissa data MA' of a dividend outputting from the firs normalizing circuit 5, outputting it after shifting it to the right by three bits, outputting it after shifting it to the left by one bit, or outputting intact the output from the latch 13 of the dividing circuit 100 according to the control signals 21, 22, 23 given from the control circuit 18 and the control signal 16 given from the subtracter 8

In FIG. 5, reference numeral 25 designates an input signal given to the respective transistor gates of a 3-bit right shift circuit 51 which outputs the mantissa data MA' outputted from the first normalizing circuit 5 after shifting it to the right by three bits, numeral 26 designates an input signal given to the respective transistor gates of a mantissa data through output circuit 52 which through-outputs intact the mantissa data MA' outputted from the first normalizing circuit 5, numeral 27 designates an input signal given to the respective transistor gates of a 1-bit left shift circuit 53 which outputs the mantissa data MA' outputted from the first normalizing circuit 5 after shifting it to the left by one bit, and numeral 28 designates an input signal given to the respective transistor gates of a latch output data through output circuit 54 which through-outputs intact the data outputted from the latch 13.

The control signal 21 outputted from the control circuit 18 is inputted to the first selector 7 as the input signal 26 through two-stage inverters 47, 42. Accordingly, since the control signal 21 and the input signal 26 have the same logic, the input signal 26 becomes "1" when the control signal 21 is "1".

The control signal 22 outputted from the control circuit 18 is inputted as the input signal 25 through one input terminal of a NAND gate 45 and an inverter 41, and as the input signal 27 through one input terminal of a NAND gate 48 and an inverter 43. And to the other input terminal of the NAND gate 45, the control signal 16 outputted from the subtracter 8 is inputted after being inverted by an inverter 46, and to the other input terminal of the NAND gate 48, the control signal 16 outputted from the subtracter 8 is inputted intact. Accordingly, when the control signal 16 is "0" in the case where the control signal 22 is "1", the input signal 25 becomes "1", and when the control signal 16 is "1" in the same case, the input signal 27 becomes "1".

The control signal 23 outputted from the control circuit 18 is inputted to the first selector 7 as an input signal 28 through two-stage inverters 49, 44. Accordingly, since the output signal 23 and the input signal 28 have the same logic, the input signal 28 becomes "1" when the control signal 23 is "1".

Data are inputted to the first selector 7 so that the corresponding bits among the bits from 0th bit to 59th bit of the mantissa data MA' of a dividend outputted from the first normalizing circuit 5 and the bits from 0th bit to 59th bit of data outputted from the latch 13 are inputted respectively in the state of being adjacent to each other from 0th bit to 59th bit of the first selector 7.

The respective bits of the mantissa data MA' from first bit input to 56th bit input given to the first selector 7 have the same configuration. That is, an input signal line of i-th bit (i=1 to 56) of the mantissa data MA' is connected to an output signal line of i+3-th bit through a transistor of the 3-bit right shift circuit 51 which is on when the input signal 25 is "1", to an output signal line of i-th bit through a transistor of the mantissa data through output circuit 52 which is on when the input signal 26 is "1", and to an output signal line of i-1-th bit through a transistor of the 1-bit left shift circuit 53 which is on when the input signal 27 is "1", respectively.

And an input signal line of 0th bit of the mantissa data MA' is not connected to the 1-bit left shift circuit 53. Accordingly there is no path for one-bit left shifting. And input signal lines from 57th to 59th bit of the mantissa data MA' are not connected to the 3-bit right shift circuit. 51. Accordingly, there is no path for three-bit right shifting.

In addition, respective input signal lines from 0th bit to 59th bit of output data from the latch 13 are respectively connected to output signal lines from 0th to 59th bit through a transistor of the latch output data through output circuit 54 which is on when the input signal 28 is "1".

The operation of the first selector 7 having such a configuration is as follows.

The first selector 7 selectively outputs the inputted data corresponding to values of the control signals 21, 22, 23 given from the control circuit 18 and a value of the control signal 16 given from the subtracter 8.

When the control signal 21 outputted from the control circuit 18 is "1", the other control signals 22 and 23 are always "0", and regardless of a value of the control signal 16, only the input signal 26 becomes "1". In this case, the respective transistors of the mantissa data through output circuit 52 are on and the respective bits of the mantissa data MA' are through-outputted.

When the control signal 22 outputted from the control circuit 18 is "1", the other control signals 21 and 23 are always "0", and the control signal 16 is to determine selected data. That is, when the control signal 22 is "1", the control signal 21 and 23 are "0", and the control signal 16 is "0", only the input signal 25 becomes "1". In this case, the respective transistors of the 3-bit right shift circuit 51 is on, and the respective bits of the mantissa data MA' are shifted respectively to the right by three bits and outputted. On the other hand, when the control signal 22 is "1", the control signals 21 and 23 are "0" and the control signal 16 is "1", only the input signal 27 becomes "1". In this case, the respective transistors of the 1-bit left shift circuit 53 is on and the respective bits of the mantissa data MA' are respectively shifted to the left by one bit and outputted.

When the control signal 23 outputted from the control circuit 18 is "1", the other control signals 21 and 22 are always "0", and regardless of a value of the control signal 16, only the input signal 28 becomes "1". In this case, the respective transistors of the latch output data through output circuit 54 are on, and the respective bits of data outputted from the latch 13 are through outputted intact.

Figure 6:
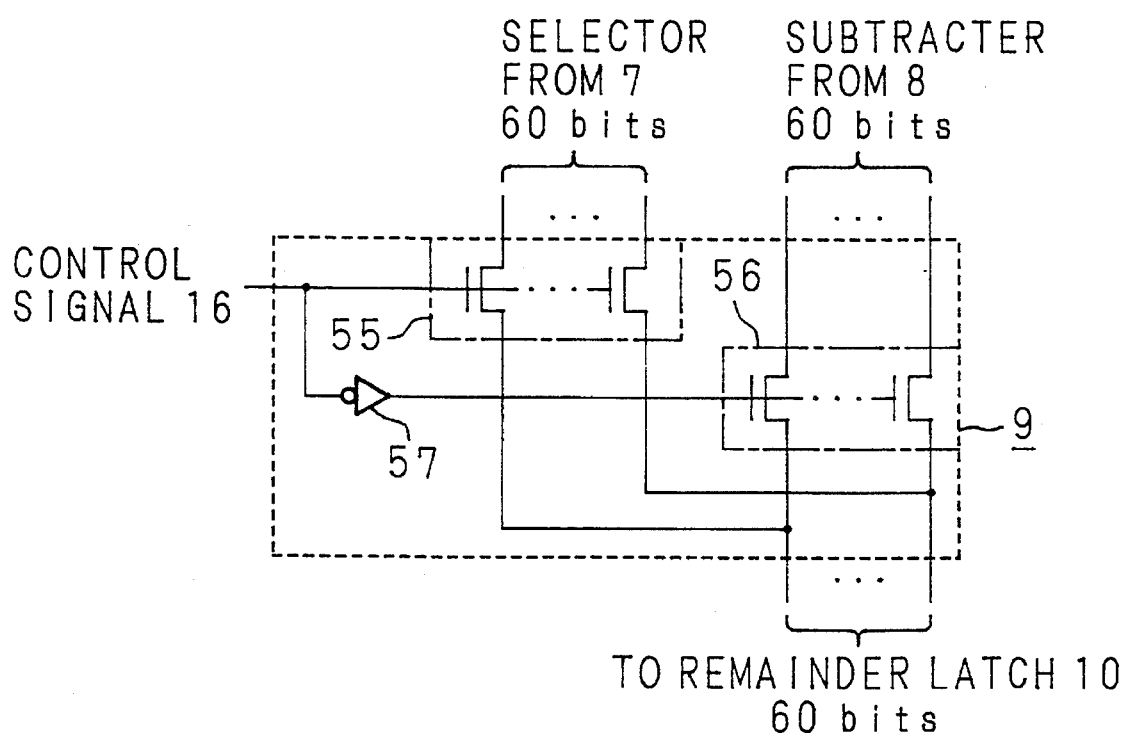
FIG. 6 is a circuit diagram showing a configuration example of a second selector of a first invention of a divider of the invention.

FIG. 6 is a circuit diagram showing a concrete configuration example of a second selector 9 of the first invention of a divider of the invention.

To the second selector 9, an output of 60 bits from the first selector 7 and an output of 60 bits from the subtracter 8 are inputted, and the second selector 9 outputs data of 60 bits to the remainder latch 10.

In the second selector 9, the respective signal lines of 60 bits inputted from the first selector 7 are connected to an output signal line through the respective transistors of the circuit 552 and the respective signal lines of 60 bits inputted from the subtracter 8 are connected to an output signal line through the respective transistors of the circuit 56. The respective transistors of the circuit 55 are on when the control signal 16 is "1", and the respective transistors of the circuit 56 are on when the control signal 16 is "0", the control signal 16 being given through an inverter 57.

Accordingly, when the control signal 16 outputted from the subtracter 8 is "1", the respective transistors of the circuit 55 are on and the mantissa data of the first selector 7 is outputted, and when the control signal 16 is "0", the respective transistors of the circuit 56 are on and the subtraction result data of the subtracter 8 is outputted.

As described in the above, according to an embodiment of the first invention of a divider of the invention, hexadecimal normalizing shift is performed once before a division for the mantissa data whose base is 16 and performs bit alignment necessary for hexadecimal division in advance by selectively using a one-bit left shift function, a three-bit left shift function and a three-bit right shift function which are built in the first selector 7. Therefore, after that, only by repeating processings by predetermined number of times, division result can be obtained. Accordingly, in addition to medium means for performing binary normalizing shift, a shifter for compensating bit shift caused at binary normalizing shift becomes unnecessary. Thereby the operation speed is improved.

And, as to a hardware configuration, by the reasons in the following, it is possible to reduce some quantity of hardware. The exponent and sign generating circuit 14, for example, does not have to hold both the binary normalizing shift quantity and hexadecimal normalizing shift quantity, but it only have to hold the hexadecimal normalizing shift quantity performed before division. Further, as to the normalizing shifters included in both of the normalizing circuits 5, 6, it must be capable of shifting for whole bits when binary normalizing shift is performed, but when hexadecimal normalizing shift is performed, it is proper that it can shift every four bits, therefore the shifters can be reduced to a quarter of hardware quantity when compared with the conventional one. And a shifter for compensating bit shift caused at binary normalizing shift becomes unnecessary.

[Second Embodiment]

In the aforesaid first, invention, a one-bit left shift, function, the 1-bit left shift circuit 53 to be concrete, as shown in FIG. 5 is provided, however, it is possible to reduce the one-bit left shift function from the first selector 7 by utilizing the 1-bit left shifter 12 of the dividing circuit 100 in place of the circuit 53 in step 2 of the first cycle. Explanation will be made on the second invention in the follows.

Figure 7:
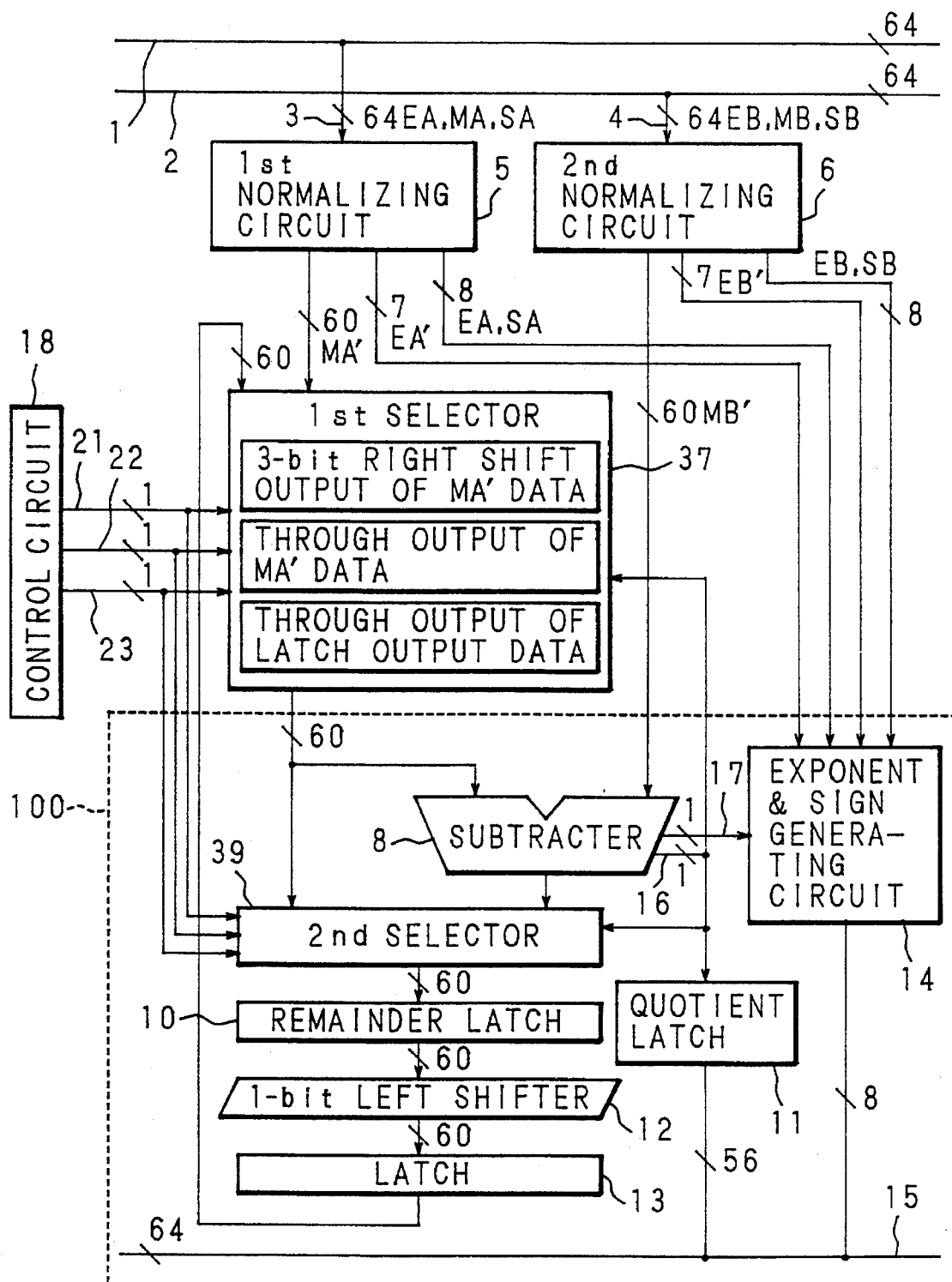
FIG. 7 is a block diagram showing a configuration example of an embodiment of a second invention of a divider of the invention, FIG. 8(a) and (b) are flow charts showing an operation procedure of a second invention of a divider the invention.

FIG. 7 is a block diagram showing a configuration example of an embodiment of the second invention of a divider of the invention.

In FIG. 7, since reference numerals 1 to 6, 8, 10 to 17, and 21 to 23 designate the same ones as in the embodiment of the first invention shown in FIG. 2 of a divider of the invention, explanation thereof will be omitted.

Reference numeral 37 designates a first selector which corresponds to the first selector 7 of the first invention. The first selector 37 selects either the mantissa data which is an output from the first normalizing circuit 5 or the remainder data which is an output from the latch 13 of the dividing circuit 100 according to the control signals 21, 22, 23 given from the control circuit 18 and outputs selected data to the dividing circuit 100.

Numeral 39 designates a second selector which corresponds to the second selector 9 of the first invention. The second selector 39 selects either the subtraction result which is an output of the subtracter 8 or the mantissa data which is an output of the first selector 37 according to the control signals 21, 22, 23 given from the control circuit 18 and outputs it to the remainder latch 10.

In the aforesaid first invention, the control signals 21, 22, 23 outputted from the control circuit 18 are given only to the first selector 7 which corresponds to the first selector 37 of the second invention, however, in the second invention they are also given to the second selector 39 which corresponds to the second selector 9 of the first invention.

Figure 8A:
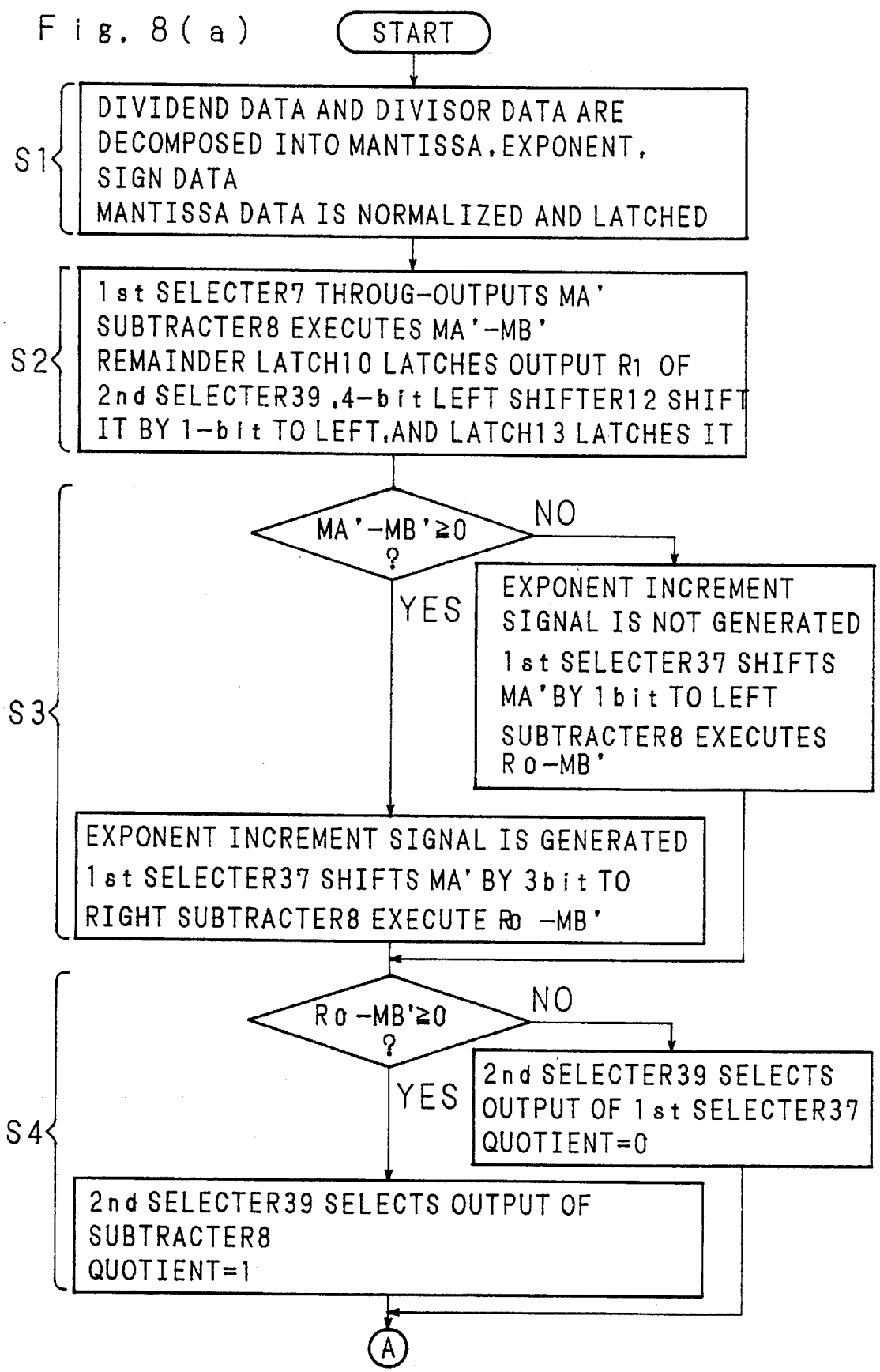
Figure 8B:
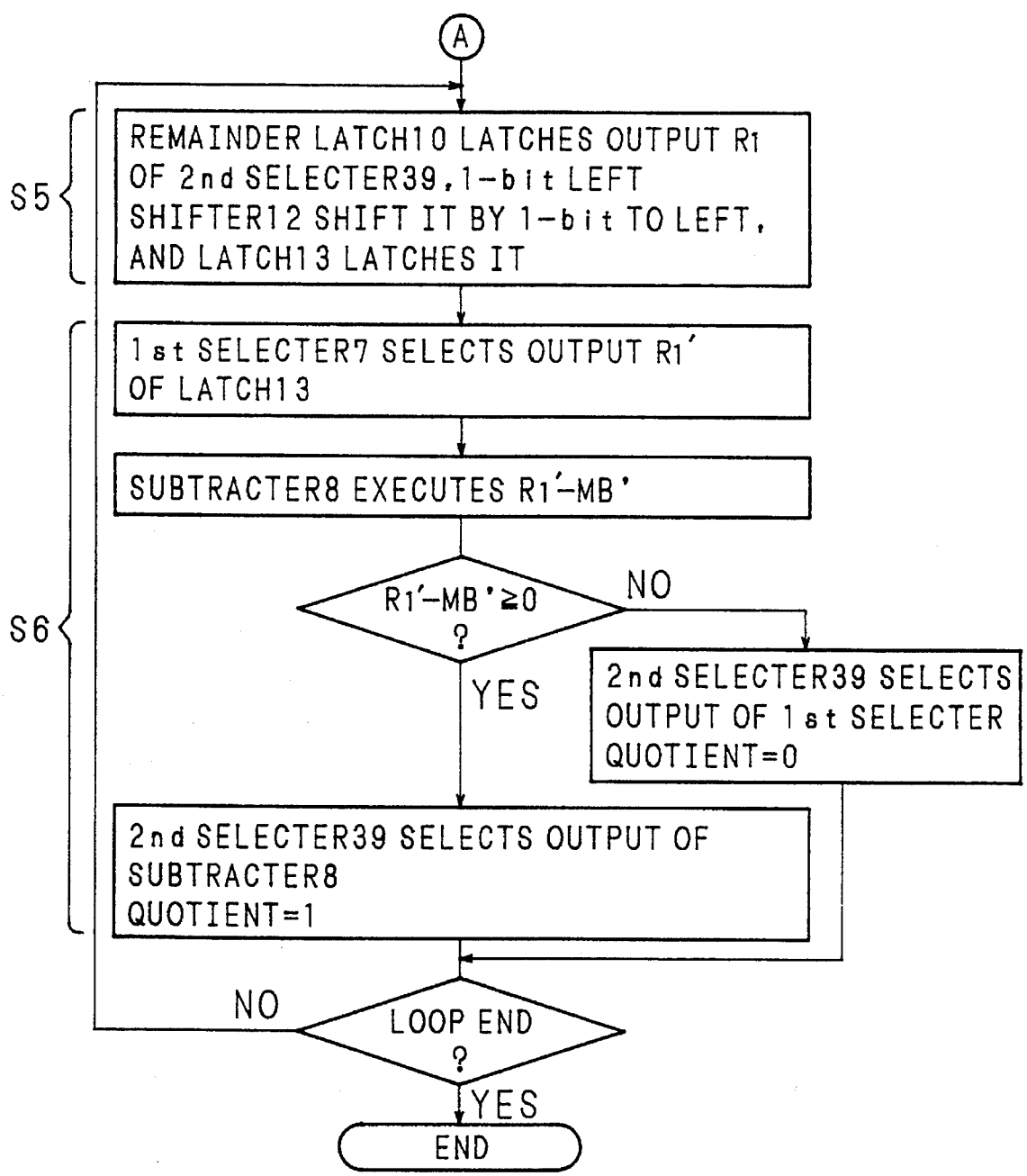
Figure 9:
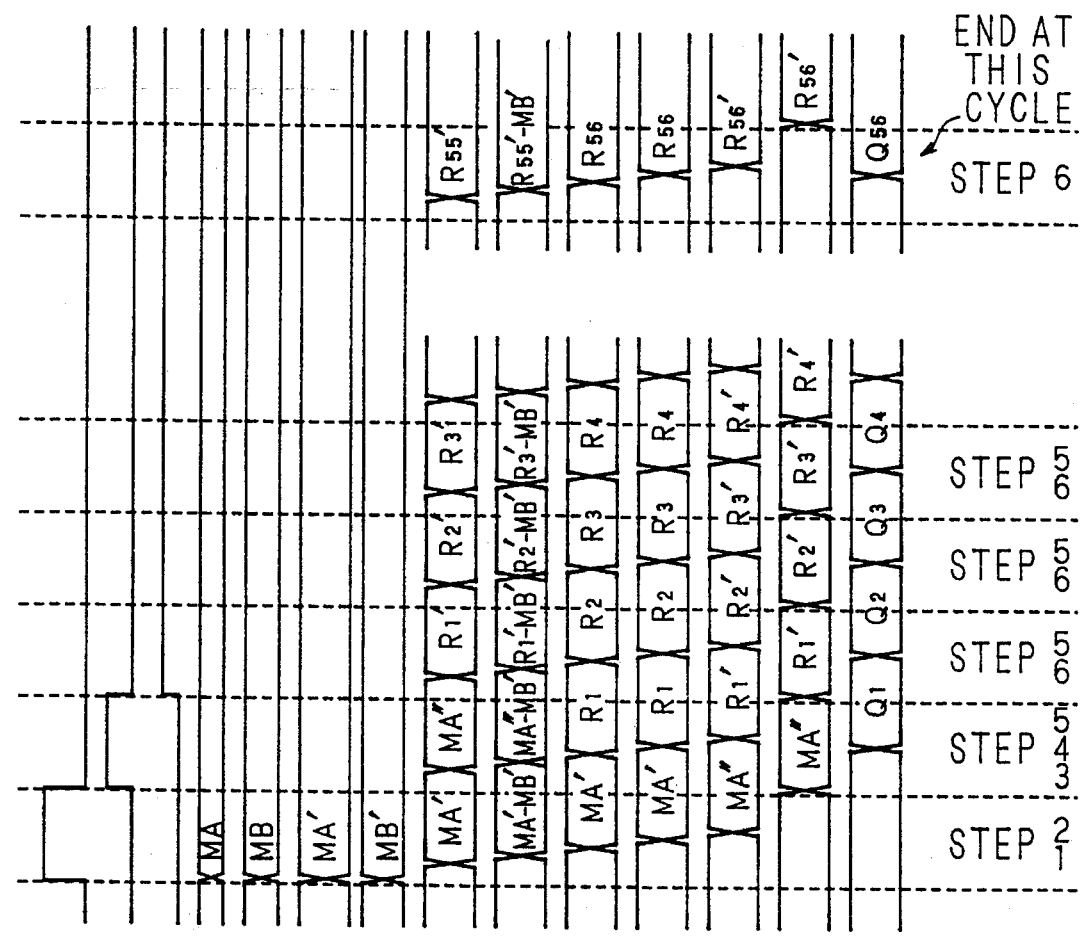
FIG. 9 is a timing chart showing an operation timing of a second invention of a divider of the invention.

Next, explanation will be given on the operation of the second invention of a divider of the invention having such a configuration as shown in FIG. 7, referring to flow charts of FIG. 8(a) and FIG. 8(b) and a timing chart of FIG. 9 showing the operation procedures.

The selectors 37 and 39 can always know the division cycles according to the control signals 21, 22, 23 showing the division cycles generated from the control circuit 18.

Processings from step 1 to step 2 are performed as the first cycle processings.

<Step 1>

Floating point data of 64 bits of a dividend is inputted from the input bus 1 through the path 3, and decomposed into the exponent data EA of 7 bits, the mantissa data MA of 56 bits, and the sign data SA of one bit, by the first normalizing circuit 5 for a dividend.

The exponent data EA of 7 bits and the sign data SA of one bit are latched at the first normalizing circuit 5, and data of 8 bits obtained by concatenating the above two data together is transmitted to the exponent and sign generating circuit 14. The mantissa data MA of 56 bits is made to be the mantissa data MA' of 60 bits by, in addition to hexadecimal normalization, zero-extending the upper one bit and lower three bits thereof, and latched at the first normalizing circuit. 5, and transmitted to the first selector 37 as well. And the normalizing shift quantity data EA' of 7 bits at hexadecimal normalizing at the first normalizing circuit 5 is also latched at the first normalizing circuit 5, and transmitted to the exponent and sign generating circuit 14 as well.

On the other hand, floating point data of 64 bits of a divisor is inputted from the input bus 2 through the path 4 and decomposed into the exponent data EB of 7 bits, the mantissa data MB of 56 bits, and the sign data SB of one bit by the second normalizing circuit 6 for a divisor.

The exponent data EB of 7 bits and the sign data SB of one bit are latched at the second normalizing circuit 6, and data of 8 bits obtained by concatenating the above two data together is transmitted to the exponent and sign generating circuit 14 as well. The mantissa data MB of 56 bits is made to be the mantissa data MB' of 60 bits by, in addition to hexadecimal normalization, zero-extension of its upper one bit and lower three bits, and latched at the second normalizing circuit 6, and transmitted to the subtracter 8 as well. The normalizing shift quantity data EB' of 7 bits at hexadecimal normalizing at the second normalizing circuit 6 is also latched at the second normalizing circuit 6, and transmitted to the exponent and sign generating circuit 14 as well.

The reason to zero-extend the upper one bit and lower three bits of the mantissa data MA and MB of 56 bits of the dividend and the divisor is that a bit width obtained by adding four bits to a bit width of the mantissa is necessary in performing right shifting by three bits at the first selector 37 or left shifting by one bit at the 1-bit left shifter 12, and the description will be made later.

<Step 2>

In the first cycle, the mantissa data MA' of 60 bits of a dividend transmitted from the first normalizing circuit 5 to the first selector 37 is outputted intact from the first selector 37 without changing the value and transmitted to the subtracter 8 and the second selector 39. The subtracter 8 performs subtraction MA'−MB' by making use of the mantissa data MA' of 60 bits of a dividend transmitted from the first selector 37 and the mantissa data MB' of 60 bits of a divisor transmitted from the second normalizing circuit 6, thereby judges which is larger. The result of the comparison, that is, negative or non-negative of the subtraction result is transmitted to the first selector 37 and the second selector 39 as the control signal 16 of one bit.

The second selector 39, when the control signal 16 is inputted, selectively outputs the mantissa data MA' of 60 bits transmitted from the first selector 37 and transmits it to the remainder latch 10. The mantissa data MA' of 60 bits latched by the remainder latch 10 is shifted to the left by one bit by the 1-bit left shifter 12, then latched by the latch 13 as the data MA" whose lower one bit is zero-extended.

In the second cycle, processings from step 3 to step 5 are performed on the basis of the result of the first cycle.

<Step 3>

In step 3, mantissa data of 60 bits selectively outputted by the first selector 37 is called to the MA'".

When the control signal 16 transmitted from the subtracter 8 to the first selector 37 is "0", that is, when MA'≧MB' is represented, the first selector 37 selects the mantissa data MA' of 60 bits of a dividend transmitted from the first normalizing circuit 5, shifts selected mantissa data MA' to the right by three bits, and further transmits the mantissa data MA'" of 60 bits whose upper three bits are zero-extended to the subtracter 8 and the second selector 39. In this case, the subtracter 8 generates the exponent increment signal 17 of one bit and transmits it to the exponent and sign generating circuit 14.

On the other hand, when the control signal 16 transmitted from the subtracter 8 to the first selector 37 is "1", that is, when MA'<MB' is represented, since the first selector 37 selects the mantissa data MA" of 60 bits latched in advance in the first cycle by the latch 13, MA'"=MA", and the selected data is transmitted to the subtracter 8 and the second selector 39. In this case, the subtracter 8 does not generate the exponent increment signal 17.

The subtracter 8 performs subtraction MA'"–MB' by making use of the mantissa data MA'" of 60 bits of a dividend and the mantissa data MB' of 60 bit of a divisor which has been transmitted, and transmits the subtraction result (MA'"–MB') of 60 bits to the second selector 39 and the control signal 16 of one bit indicating negative or non-negative of the subtraction result to the quotient latch 11, the first selector 37 and the second selector 39.

<Step 4>

In step 4, remainder data of 60 bits selectively outputted by the second selector 39 is called $R_1$ and a generated quotient of one bit is called $Q_1$.

When the control signal 16 transmitted from the subtracter 8 to the second selector 39 is "0", that is, when MA'"≧MB' is represented, since the second selector 39 selects the subtraction result (MA'"–MB') of 60 bits transmitted from the subtracter 8, the remainder data $R_1$ becomes as $R_1$=MA'"–MB'. In this case, the quotient latch 11 generates a one bit quotient $Q_1$=1 according to the transmitted control signal 16 and latches it.

On the other hand, when the control signal 16 transmitted from the subtracter 8 to the second selector 39 is "1", that is, when MA'"<MB', since the second selector 39 selects the mantissa data MA'" of 60 bits of a dividend transmitted from the first selector 37, the remainder data $R_1$ becomes as $R_1$=MA'". In this case, the quotient latch 11 generates a one bit quotient $Q_1$=0 according to the transmitted control signal 16 and latches it.

<Step 5>

The remainder data $R_1$ of 60 bits selected by the second selector 39 is transmitted to the remainder latch 10 and latched.

The remainder data $R_1$ of 60 bits latched by the remainder latch 10 is shifted to the left by one bit by the 1-bit left shifter 12, and the lower one bit thereof is zero-extended (hereinafter, to be called $R_1$') and latched by the latch 13.

In the third cycle, processings of step 6 and step 5 performed.

<Step 6>

In step 6, remainder data of 60 bits selectively outputted by the second selector 39 is called $R_2$ and a generated one bit quotient is called $Q_2$.

The first selector 37 selects the remainder data $R_1$' of 60 bits being latched by the latch 13 and transmitted to the subtracter 8 and the second selector 39. The subtracter 8 performs subtraction $R_1$'–MB' by making use of the remainder data $R_1$' of 60 bits transmitted from the first selector 37 and the mantissa data MB' of 60 bits of a divisor transmitted from the second normalizing circuit 6, and transmits the subtraction result ($R_1$'–MB') of 60 bits to the second selector 39 and the one bit control signal 16 indicating negative or non-negative of the subtraction result to the quotient latch 11, the first selector 37 and the second selector 39.

When the control signal 16 transmitted from the subtracter 8 to the second selector 39 is "0", that is, when $R_1$'MB' is represented, since the second selector 39 selects the subtraction result ($R_1$'–MB') of 60 bits from the subtracter 8, the remainder data $R_2$ becomes as $R_2$=$R_1$'–MB'. In this case, the quotient latch 11 generates a one bit quotient $Q_2$=1 according to the transmitted control signal 16, and shifts the data of itself to the left by one bit, then latches it to the LSB as well.

On the other hand, the control signal 16 transmitted from the subtracter 8 to the second selector 39 is "1", that is, when $R_1$'<MB' is represented, since the second selector 39 selects the remainder data $R_1$' transmitted from the first selector 37, the remainder data $R_2$ becomes as $R_2$=$R_1$'. In this case, the quotient latch 11 generates a one bit, quotient $Q_2$=0 according to the transmitted control signal 16, and shifts the data of itself to the left by one bit, then latches it to the LSB.

<Step 5>

The remainder data $R_2$ of 60 bits selected by the second selector 39 is transmitted to the remainder latch 10 and latched. The remainder data $R_2$ of 60 bits latched by the remainder latch 10 is shifted to the left by one bit by the 1-bit left shifter 12, then the lower one bit thereof is zero-extended (hereinafter to be called $R_2$'), and latched by the latch 13.

By repeating the aforementioned third cycle processings by "the bit number of the mantissa-1" times, mantissa data of a quotient of bit number equal to that of mantissa, that is, 56 bits is determined, and latched at the quotient latch 11 in the state of being hexadecimal normalized.

And exponent data of 7 bits of a quotient is obtained as follows. At first, in the exponent and sign generating circuit 14, exponent operations of EA–EA'–EB+EB' and EA–EA'–EB+EB'+1 are performed among the exponent data EA of 7 bits and the normalizing shift quantity data EA' of a dividend transmitted from the first normalizing circuit 5, and the exponent data EB of 7 bits and the normalizing shift quantity data EB' of a divisor transmitted from the second normalizing circuit 6. And the exponent and sign generating circuit 14 makes the operation result of EA–EA'–EB+EB' be exponent data of a quotient when the exponent increment signal 17 is not transmitted from the subtracter 8, and makes the operation result of EA–EA'–EB+EB'+1 be exponent data of a quotient when the exponent increment signal 17 is transmitted.

One bit sign data of a quotient is generated at the exponent and sign generating circuit, 14 from the exclusive OR operation between the sign data SA of a dividend transmitted from the first normalizing circuit 5 and the sign data SB transmitted from the second normalizing circuit 6.

After the operation, exponent data of 56 bits of a quotient is outputted from the quotient latch 11 to the output bus 15, and exponent and sign data of 8 bits is transmitted from the exponent and sign generating circuit 14 to the output bus 15.

Next, explanation will be given on a first selector 37 of the second invention of a divider of the invention.

Figure 10:
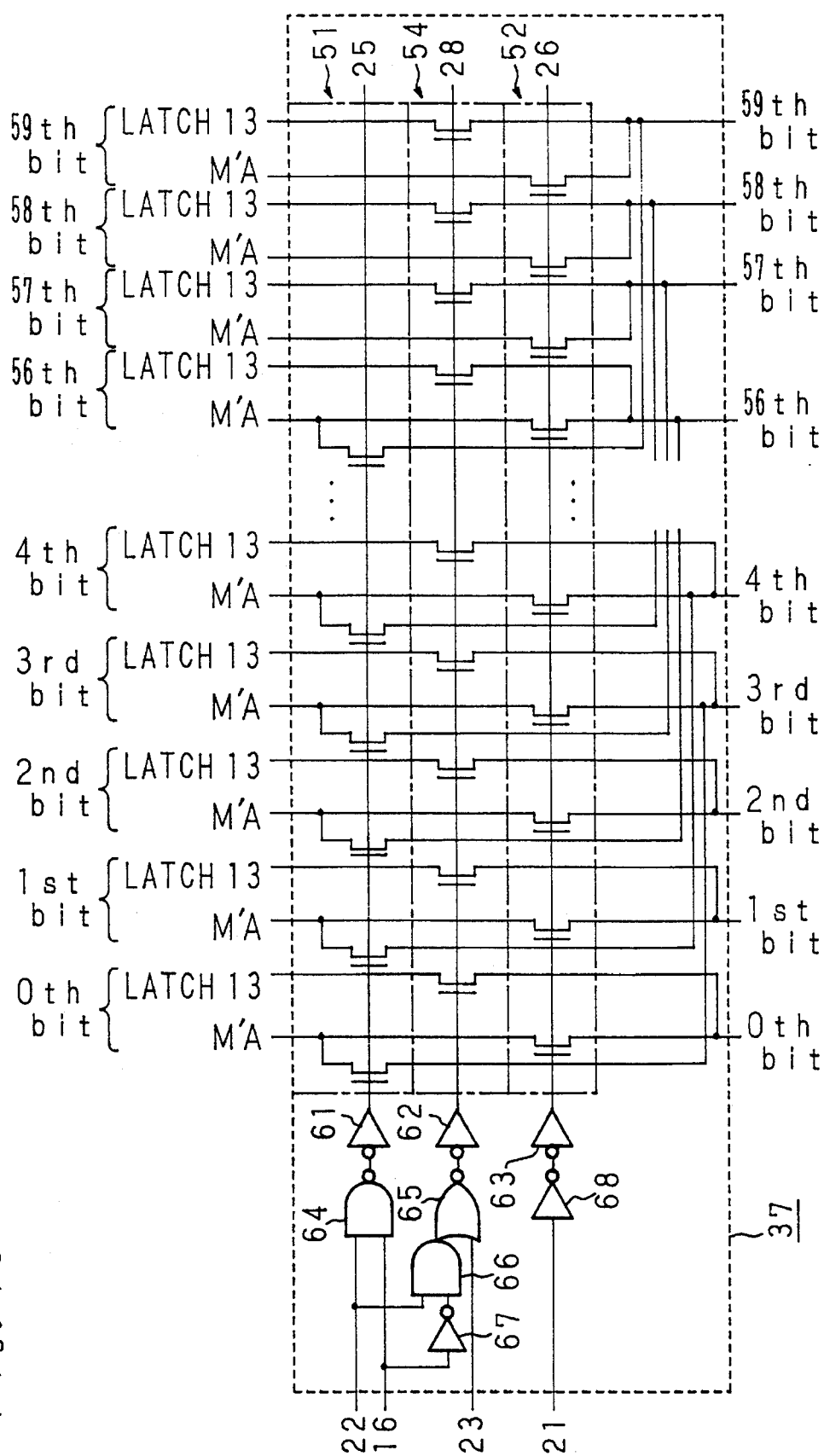
FIG. 10 is a circuit diagram showing a configuration example of a first selector of a second invention of a divider of the invention.

FIG. 10 is a circuit diagram showing a concrete configuration example of the first selector 37 of the second invention of a divider of the invention.

In addition, in FIG. 10, since reference numerals 25, 26, 28, 51, 52 and 54 designate the same ones shown in the circuit diagram of the first selector 7 shown in FIG. 5 in the aforesaid first invention, explanation thereof will be omitted.

The first selector 37 has an input of 60 bits and an output of 60 bits, and performs either of the operation of outputting (through output) intact the mantissa data MA' of a dividend outputted from the first normalizing circuit 5, outputting the same after shifting it to the right by three bits, or outputting the same intact the output from the latch 13 of the dividing circuit 100 according to the control signals 21, 22, 23 given from the control circuit 18 and the control signal 16 given from the subtracter 8.

The control signal 21 outputted from the control circuit 18 is inputted to the first selector 37 as the input signal 26 through the two-stage inverters 68, 63. Accordingly, since the control signal 21 and the input signal 26 have the same logic, when the control signal 21 is "1", the input signal 26 becomes "1".

The control signal 22 outputted from the control circuit 18 is inputted as the input signal 25 through one input terminal of a NAND gate 64 and an inverter 61, and inputted as the input signal 28 through one input terminal of an AND gate 66 and an inverter 62. And to the other input terminal of the NAND gate 64, the control signal 16 outputted from the subtracter 8 is inputted intact, and to the other input terminal of the AND gate 66, the control signal 16 outputted from the subtracter 8 is inputted after being inverted by an inverter 67. Therefore, when the control signal 16 is "1" in the case where the control signal 22 is "1", the input signal 25 becomes "1".

The control signal 23 outputted from the control circuit 18 is input ted to one input terminal of a NOR gate 65. To the other input terminal of the NOR gate 65, the output of the AND gate 66 is inputted. And the output of the NOR gate 65 is inputted to the first, selector 37 as the input signal 28 through the inverter 62. Accordingly, when the control signal 22 is "1" and the control signal 16 is "0", or when the control signal 23 is "1", the input signal 28 becomes "1".

Data is inputted to the first selector 37 so that the corresponding bits among the bits from 0th bit to 59th bit of the mantissa data MA' of a dividend outputted from the first normalizing circuit 5 and bits from 0th bit to 59th bit of the data outputted from the latch 13 are inputted in the state of being adjacent to each other from 0th bit to 59th bit of the first selector 37.

The respective bits of the mantissa data MA' from 0th bit to 56th bit given to the first selector 37, have the same configuration. That is, an input signal line of i-th bit (i=0 to 56) of the mantissa data MA' is connected to an output signal line of i+3-th bit through a transistor of the 3-bit right shift circuit 51 which is on when the input signal 25 is "1", and to an output signal line of i-th bit through a transistor of the mantissa data through output circuit 52 which is on when the input signal 26 is "1", respectively.

Input signal lines from 57th to 59th bit of the mantissa data MA' are not connected to the 3-bit right shift circuit 51, and accordingly there is no path for three-bit right shifting.

In addition, respective input signal lines of 0th bit to 59th bit of output data from the latch 13 are connected respectively to output signal lines from 0th bit to 59th bit through a transistor of the latch output data through output circuit 54 which is on when the input signal 28 is "1".

The operation of the first selector 37 is as follows.

The first selector 37 selectively outputs the inputted data corresponding to values of the control signals 21, 22, 23 given from the control circuit 18 and a value of the control signal 16 given from the subtracter 8.

When the control signal 21 outputted from the control circuit 18 is "1", the other control signals 22 and 23 are always "0", and only the input signal 26 becomes "1" regardless of a value of the control signal 16. In this case, the respective transistors of the mantissa data through output circuit 52 are on and the respective bits of the mantissa data MA' are through-outputted intact.

When the control signal 22 outputted from the control circuit 18 is "1", the other control signals 21 and 23 are always; "0", and the control signal 16 is to determine selected data. That is, when the control signal 22 is "1", the control 23 is "0", and the control signal 16 is "0", only the input signal 26 becomes "1". In this case, the respective transistors of the latch output data through output circuit 54 are on, and the respective bits of data outputted from the latch 13 are through-outputted intact. On the other hand when the control signal 22 is "1", the control signal 23 is "0", and the control signal 16 is "1", only the input signal 25 becomes "1". In this case, the respective transistors of the 3-bit right shift circuit 51 are on and the respective bits of the mantissa data MA' are outputted after being shifted to the right by three bits.

Figure 11:
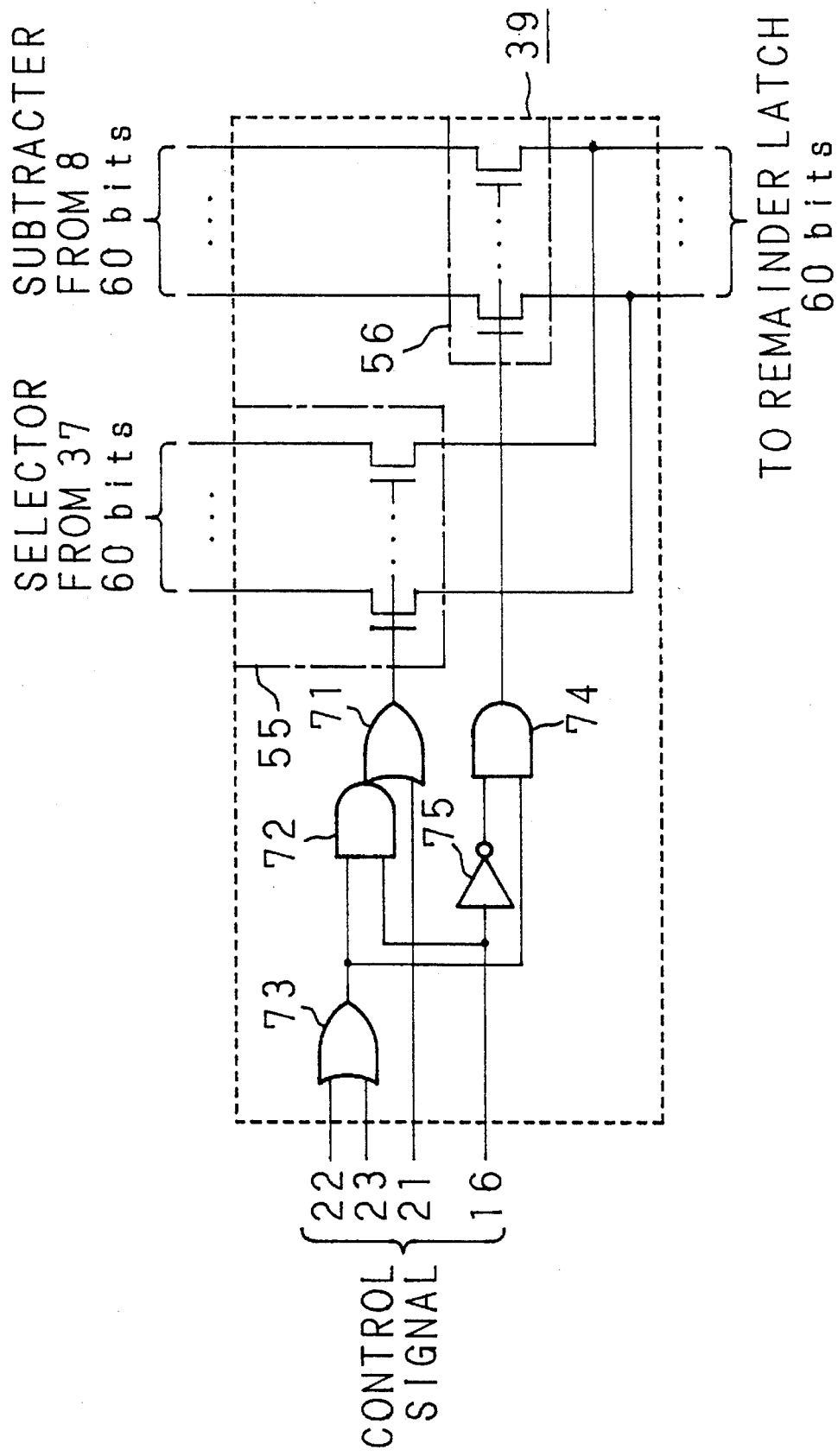
FIG. 11 is a circuit diagram showing a configuration example of a second selector of a second invention of a divider of the invention.

FIG. 11 is a circuit diagram showing a concrete configuration example of a second selector 39 of the second invention of a divider of the invention.

To the second selector 39, the output of 60 bits from the first selector 37 and the output of 60 bits from the subtracter 8 are inputted, and the second selector 39 outputs data of 60 bits to the remainder latch 10.

In the second selector 39, the respective signal lines of 60 bits inputted from the first selector 37 are connected to an output signal line through the respective transistors of the circuit 55, and the respective signal lines of 60 bits inputted from the subtracter 8 are connected to an output signal line through the respective transistors of the circuit 56.

To the second selector 39, the control signals 21, 22, 23 outputted from the control circuit 18 and the control signal 16 outputted from the subtracter 8 are given. The control signals 22 and 23 are inputted to an OR gate 73, and the output of the OR gate 73 is inputted to one input terminal of an AND gate 72 and to one input terminal of an AND gate 74. The output of the AND gate 72 is inputted to one input terminal of an OR gate 71, and to the other input terminal of the OR gate 71, the control signal 21 is inputted. In addition, the output of the OR gate 71 is connected to the respective transistors of the circuit 55. And the control signal 16 is inverted by an inverter 75 and is inputted to the other input terminal of the AND gate 74, and inputted intact to the other input terminal of the AND gate 72. In addition, the output of the AND gate 74 is connected to the respective transistors of the circuit 56.

Accordingly, the second selector 39 can selectively output the inputted data responsive to values of the control signals 21, 22, 23 and 16.

When at least one of the control signals 22 and 23 is "1", the output of the OR gate 73 becomes "1", in this case, the control signal 21 is always "0", and the control signal 16 is to determine the selected data. That is, when the control signal 16 is "1", the second selector 39 selects the output from the first selector 37, and when the control signal 16 is "0", the second selector 39 selects the output from the subtracter 8. On the other hand, both the control signal 22 and the control signal 23 are "0", the output from the OR gate 73 is "0", but, in this case, since the control signal 21 is always "1", the output of the OR gate 71 is "1" and the second selector 39 selects the output from the first selector 37 regardless of a value of the control signal 16.

As described in the above, according to an embodiment of the second invention of a divider of the invention, by constructing and controlling the 1-bit left shifter 12 to be utilized in step 2 at the first cycle, the aforesaid one-bit left shift function necessary to the first selector 7 of the first invention, the 1-bit left shift circuit 53 shown in FIG. 5 to be concrete, can be reduced.

[Third Embodiment]

By the way, in a microprocessor dealing with decimal numbers, a decimal number is notated by data of four-bit unit being a binary number obtained by converting the decimal number every decimal digit. Decimal number "19", for example, is noted by "00011001" in binary number, with "0001" obtained by binary-notating "1" of a digit of 10 and "1001" obtained by binary-notating 9 of a digit of 1.

By performing a division (hereinafter to be called decimal division) between dividend data and divisor data in which decimal numbers are binary-notated as aforementioned, by applying the second invention of a divider of the invention, binary-notated quotient data of a decimal number can be obtained.

Figure 12:
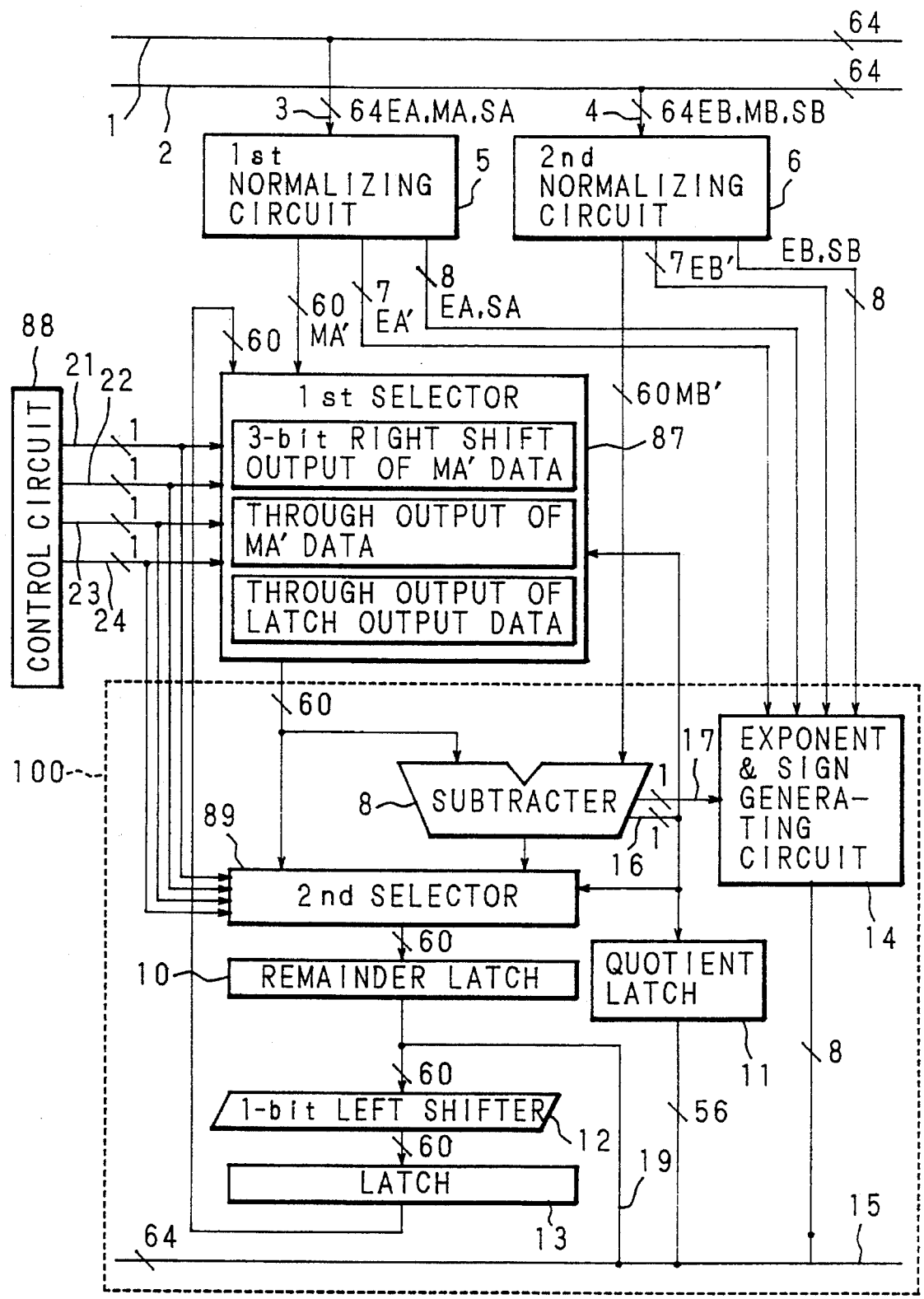
FIG. 12 is a block diagram showing a configuration example of an embodiment of a third invention of a divider of the invention, FIG. 13(a) and (b) are flow charts showing an operation procedure of a third invention of a divider of the invention.

FIG. 12 is a block diagram showing a configuration example of a third invention of a divider of the invention capable of not only performing hexadecimal division but being utilized in decimal division as well, by the fact that a signal line 19 which transmits partial remainder data outputted from the remainder latch 10 to a bus 15 is provided to the floating point divider for hexadecimal division in the aforesaid second invention, and that the control circuit 18 of the second invention is constructed as a control circuit 88 capable of generating a control signal 24 indicating a first cycle of decimal division. In addition, in FIG. 12, reference numeral 87 designates a first selector which corresponds to the first selector 37 of the second invention, and numeral 89 designates a second selector which corresponds to the second selector 39, respectively.

In addition, the fact that when control signal 21 generated by the control circuit 88 is "1", a first cycle of hexadecimal division is indicated and when the control signal 22 is "1", a second cycle of hexadecimal division is indicated, is the same as the aforesaid first and second inventions, however, in the third invention, when the control signal 23 is "1", third and after third cycles of hexadecimal division, or second and after second cycles of decimal division is indicated, and when the control signal 24 is "1", a first cycle of decimal division is indicated respectively. But while decimal division is performed, the control signals 21 and 22 are held to be "0".

By the way, generally in decimal division, at first, decimal numbers are converted into binary numbers, then division is performed to obtain a quotient of four bits (quotient of one digit in decimal number). And a partial remainder at this time is increased ten times to obtain a quotient of four bits again. By repeating such processings, a quotient having necessary digit numbers is obtained.

Therefore, when decimal division is performed by the third invention of a divider of the invention, at first, by a hardware or a software outside of the divider, dividend data and divisor data are converted into binary numbers. The dividend data converted into binary number is inputted to an input signal line (not shown) for mantissa data of the input bus 1 and the divisor data also converted into binary number is inputted to an input signal line (not shown) for mantissa data of the input bus 2, in the state of being zero-extended at the respective upper digits with aligning the bit, number of mantissa data of the divider. In this case, since only mantissa data is operated, it is not necessary to input data to the input signal lines for the exponent data and the sign data of the input buses 1 and 2.

Figure 13A:
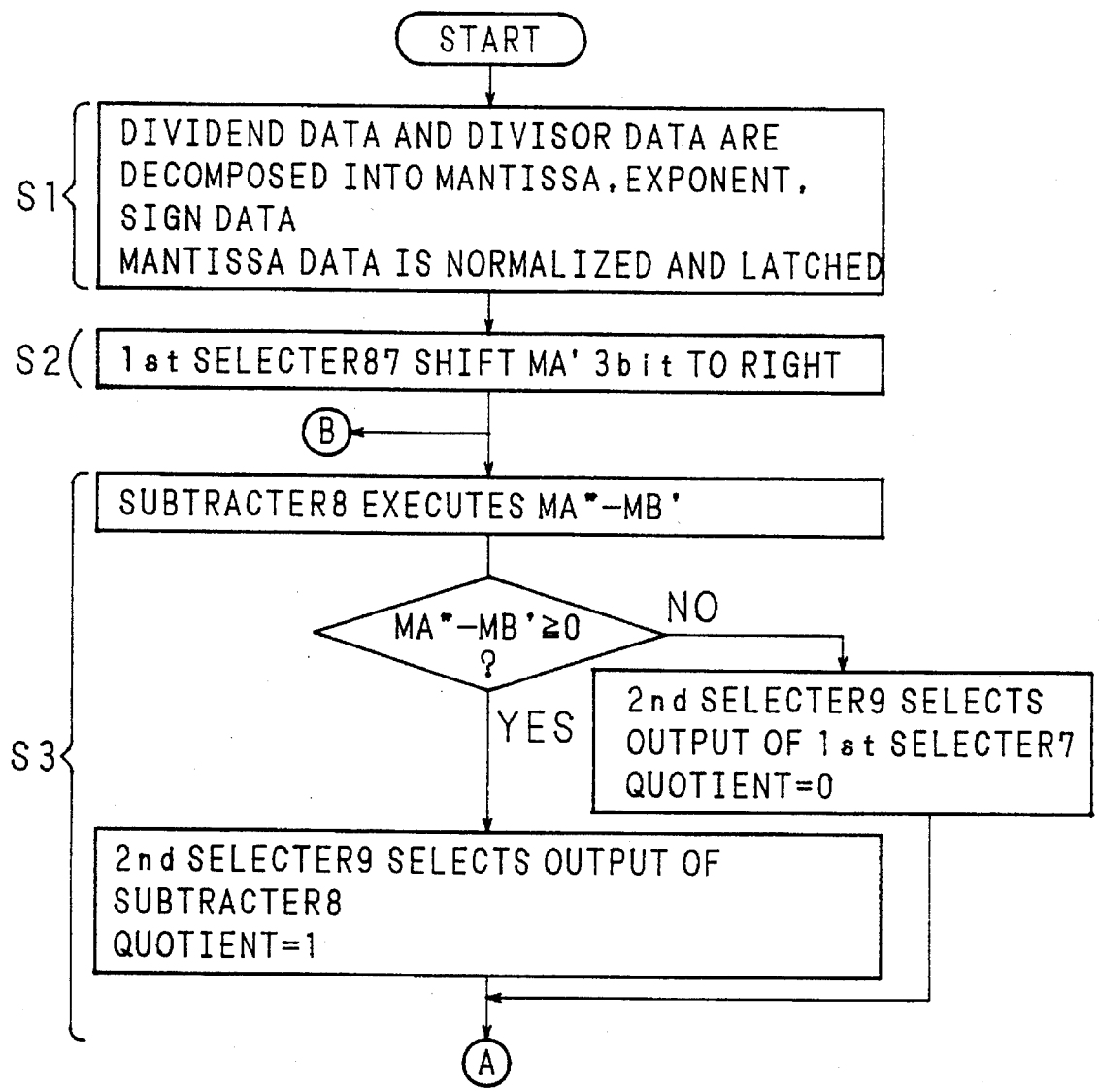
Figure 13B:
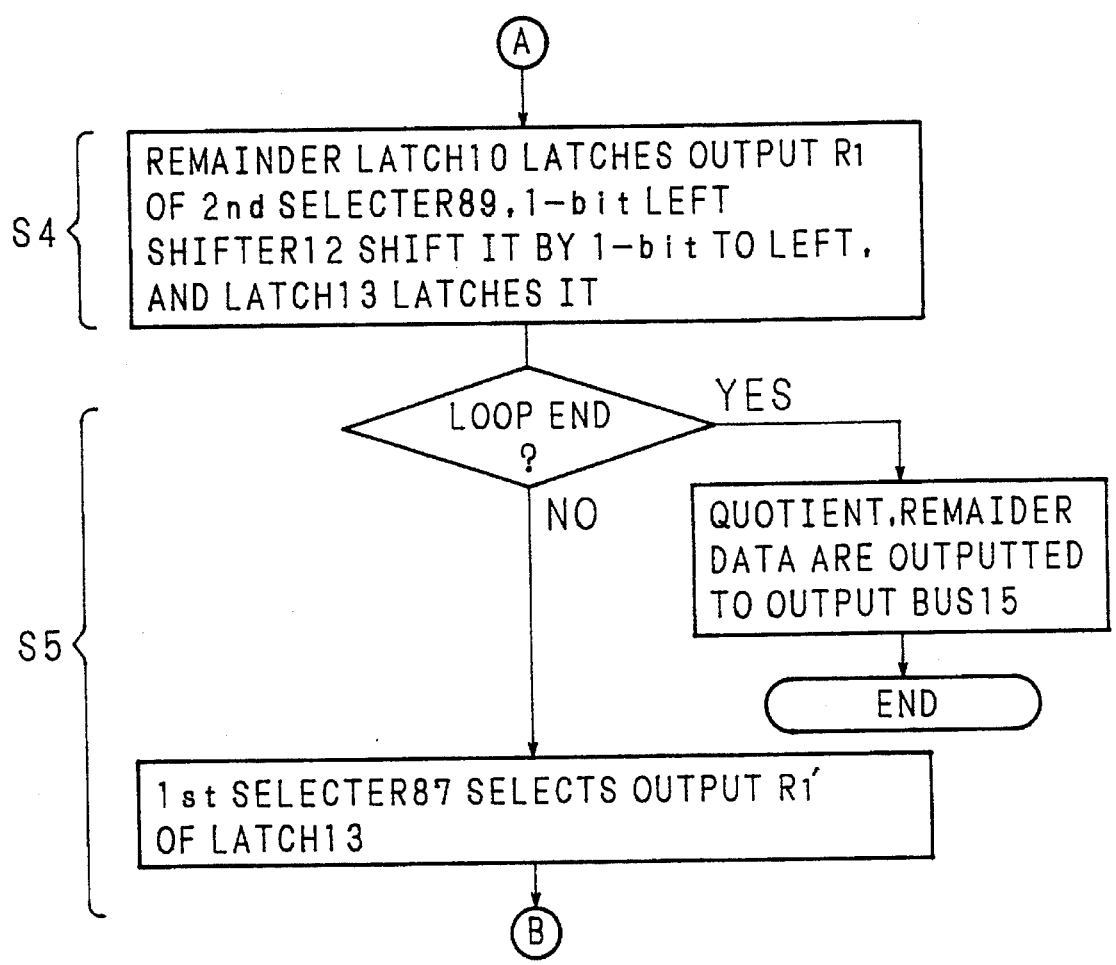
Figure 14:
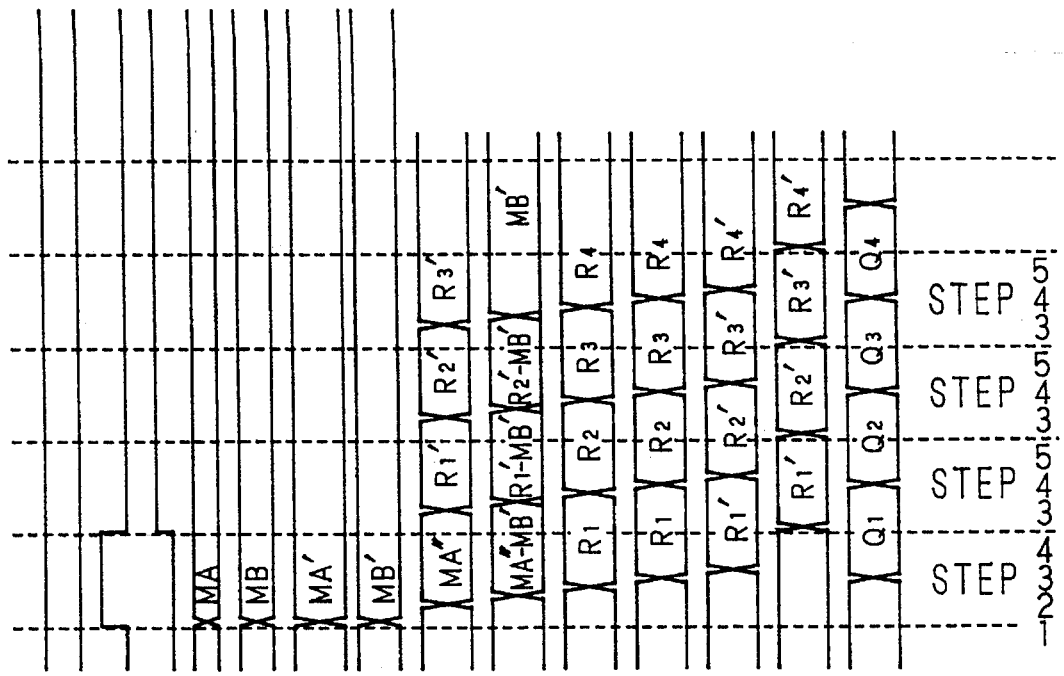
FIG. 14 is a timing chart showing an operation timing of a third invention of a divider of the invention.

Explanation will be given on the operation of the divider after inputting data, referring to flow charts of FIG. 13(a) and FIG. 13(b) showing the operation procedure and a timing chart of FIG. 14.

The selectors 87 and 89 can always know the division cycles according to the control signals 21, 22, 23, 24 indicating the division cycles generated from the control circuit 88.

Processings from step 1 to step 4 are performed as the first cycle processings.

<Step 1>

The inputted mantissa data MA of 56 bits of a dividend is zero-extended at its upper one bit and the lower three bits by the first normalizing circuit 5 and latched, and the mantissa data MA' of 60 bits is transmitted to the first selector 87 as well. The mantissa data MB of 56 bits of a divisor is zero-extended at its upper one bit and its lower three bits by the second normalizing circuit 6 and latched, and the mantissa data MB' of 60 bits is transmitted to the subtracter 8 as well.

<Step 2>

The mantissa data MA' of 60 bits transmitted from the first normalizing circuit 5 to the first selector 87 is shifted to the right by three bits, and further zero-extended at its upper three bits, and outputted as the data MA" to be transmitted to the subtracter 8 and the second selector 89.

<Step 3>

The subtracter 8 performs subtraction MA"−MB' by making use of the mantissa data MA" of 60 bits of the dividend transmitted from the first selector 87 and the mantissa data MB' of 60 bits of the divisor outputted from the second normalizing circuit 6, thereby compares which is larger. The comparison result, that is, negative or non-negative of the subtraction result is transmitted to the second selector 89 and the quotient latch 11 and the first selector 87 as the control signal 16 of one bit.

In addition, in step 3, remainder data of 60 bits selectively outputted from the second selector 89 is called $R_1$ and a one bit quotient to be generated is called $Q_1$.

When the control signal 16 transmitted from the subtracter 8 to the second selector 89 is "0", that is, MA"≧MB' is represented, since the second selector 89 selects the subtraction result (MA"−MB') of 60 bits transmitted from the subtracter 8, the remainder data $R_1$ becomes as $R_1$=MA"−MB'. In this case, the quotient latch 11 generates a one bit quotient $Q_1$=1 according to the transmitted control signal 16, and shifts data of itself to the left by one bit and latches it to the LSB.

On the other hand, the control signal 16 transmitted from the subtracter 8 to the first selector 87 is "1", that is, MA"<MB' is represented, since the second selector 89 selects the mantissa data MA" of 60 bits outputted from the first selector 87, the remainder data $R_1$ becomes as $R_1$=MA". In this case, the quotient latch 11 generates a one bit quotient $Q_1$=0 according to the transmitted control signal 16, and shifts data of itself to the left by one bit and latches it to the LSB.

<Step 4>

The remainder data $R_1$ of 60 bits selected by the second selector 89 is transmitted to the remainder latch 10 and latched. The remainder data $R_1$ latched by the remainder latch 10 is shifted to the left by one bit by the 1-bit left shifter 12 and zero-extended at its lower three bits and latched at the latch 13 as the data $R_1'$.

In the second cycle, loop processing composed of step 5, step 3 and step 4 is performed.

<Step 5>

The first selector 87 selects the remainder data $R_1'$ of 60 bits outputted from the latch 13 and through-outputs it to be transmitted to the subtracter 8 and the second selector 89.

<Step 3>

In step 3, remainder data of 60 bits selectively outputted from the second selector 89 is called $R_2$, and a one bit quotient to be generated is called $Q_2$.

The subtracter 8 performs subtraction $R_1'-MB'$ by making use of the remainder data $R_1$ of 60 bits transmitted from the first selector 87 and the mantissa data MB' transmitted from the second normalizing circuit 6, and transmits negative or non-negative of the subtraction result to the second selector 89 and the quotient latch 11 and the first selector 87 as the control signal 16 of one bit.

When the control signal 16 transmitted from the subtracter 8 to the second selector 89 is "0", that is, when MA"≧MB' is represented, since the second selector 89 selects the subtraction result ($R_1'-MB'$) of 60 bits transmitted from the subtracter 8, the remainder data $R_2$ becomes as $R_2=R_1'-MB'$. In this case, the quotient latch 11 generates a one bit quotient $Q_2=1$, and shifts data of itself to the left by one bit, and latches it to the LSB.

On the other hand, when the control signal 16 transmitted from the subtracter 8 to the first selector 87 is "1", that is, MA"<MB' is represented, since the second selector 89 selects the remainder data $R_1'$ outputted from the first selector 87, the remainder data $R_2$ becomes as $R_2=R_1'$. In this case, the quotient latch 11 generates a one bit quotient $Q_2=0$ according to the transmitted control signal 16, and shifts data of itself to the left by one bit and latches it to the LSB.

<Step 4>

The remainder data $R_2$ of 60 bits selectively outputted from the second selector 89 is transmitted to the remainder latch 10 and latched. The remainder data $R_2$ of 60 bits latched by the remainder latch 10 is shifted to the left by one bit by the 1-bit left shifter 12 and latched at the latch 13 as the data $R_2'$ which is zero-extended at its lower one bit.

By repeating the same processings as those of the aforementioned second cycle until the third and fourth cycles, since quotients $Q_3$, $Q_4$ are obtained sequentially in step 3, quotients of four bits $Q_1$, $Q_2$, $Q_3$, $Q_4$, that is, the most significant digit of a quotient of a decimal number is determined and latched by the quotient latch 11. The quotient of four bits is outputted from the quotient latch 11 to the output bus 15 in the LSB-aligned state. And also the partial remainder data $R_4$ is outputted from the remainder latch 10 through the signal line 19 to the output bus 15 in the LSB-aligned state.

At an outside hardware, outputted partial remainder data of 56 bits is increased ten times. Next upper four-bit data (second upper digit in a decimal number) of mantissa data of a decimal notated dividend, is zero-extended at its upper digit with being aligned to the bit numbers of mantissa data of the divider. Next, partial remainder data of 56 bits which has been increased ten times and data of 56 bits which has been zero-extended are added, and data obtained by addition is inputted to an input signal line (not shown) for mantissa data of the input bus 1 for a dividend. Divisor data is always constant and is already inputted.

When next data is set in such a way, a second upper digit of a quotient of a decimal number is obtained.

By repeating the aforesaid processings by the times equal to digit number of a decimal number, a decimal division is performed according to the third invention of a division of the invention shown in FIG. 12.

Next, explanation will be given on the first selector 87 of the third invention of a divider of the invention.

Figure 15:
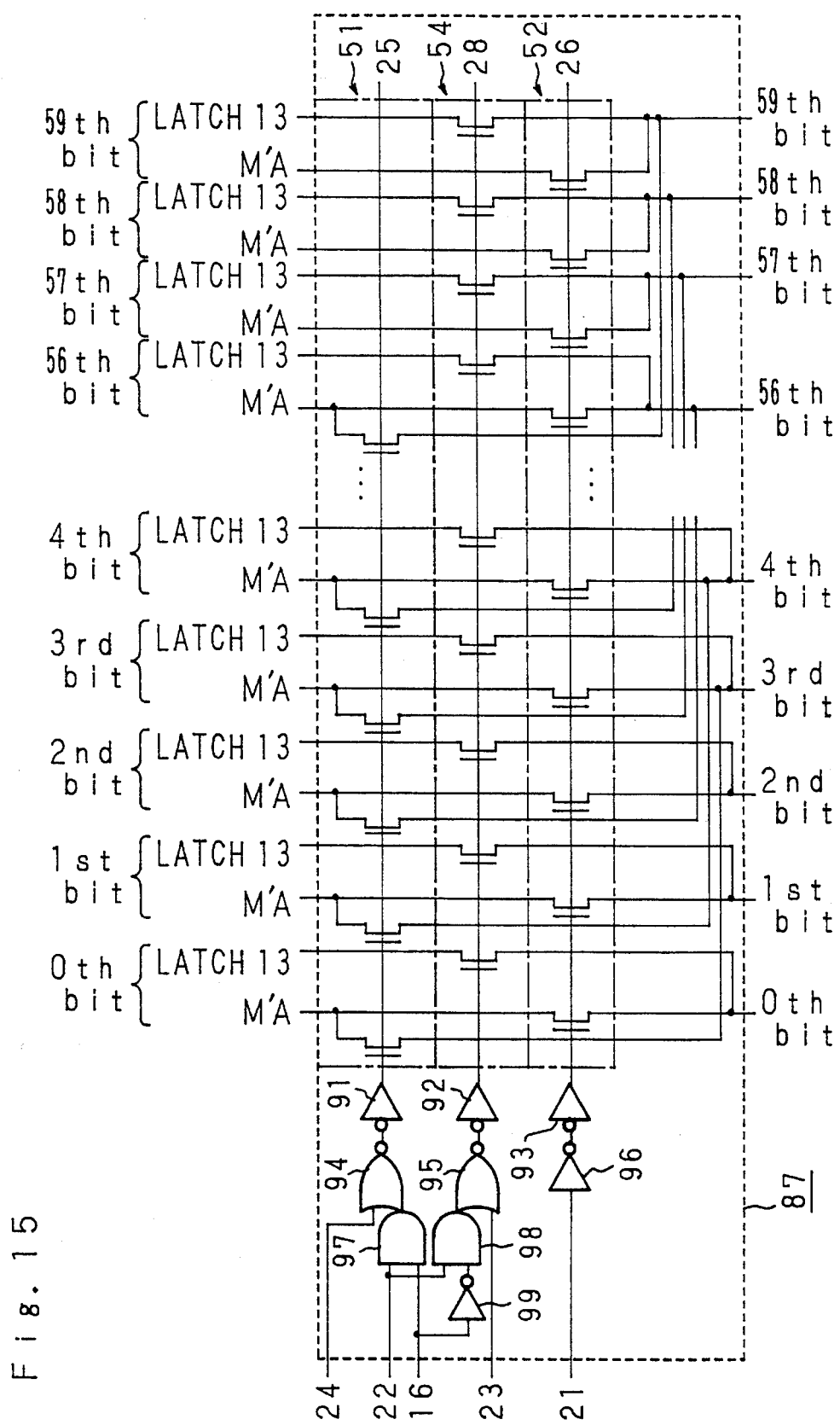
FIG. 15 is a circuit diagram showing a configuration example of a first selector of a third invention of a divider of the invention.

FIG. 15 is a concrete configuration example of the first selector 87 of the third invention of a divider of the invention.

In addition, in FIG. 15, since the reference numerals 25, 26, 28, 51, 52, and 54 designate the same ones shown in a circuit diagram of the first selector 37 shown in FIG. 10 in the aforesaid second invention, explanation thereof will be omitted.

The different point of the first, selector 87 of the third invention shown in FIG. 15 from the first selector 37 of the second invention shown in FIG. 10 is a relationship between the control signals 21, 22, 23, 24 outputted from control circuit 88, the control signal 16 outputted from the subtracter 8, and the respective input signals 25, 26, 28. In the following, explanation will be made concretely.

The first selector 87 has an input of 60 bits and an output of 60 bits, and performs either of the operation of outputting (through output) intact the mantissa data MA' of a dividend from the first normalizing circuit 5, outputting the same after shifting it to the right by three bits, or outputting intact the output from the latch 13 of the dividing circuit 100 according to the control signals 21, 22, 23 and 24 given from the control circuit 88 and the control signal 16 given from the subtracter 8.

The control signal 21 outputted from the control circuit 88 is inputted to the first selector 87 through two-stage inverters 96, 93. Accordingly, since the control signal 21 and the input signal 26 have the same logic, the input signal 26 becomes "1" when the control signal 21 is "1".

The control signal 22 outputted from the control circuit 88 is inputted to one input terminal of an AND gate 97 and one input terminal of an AND gate 98. The control signal 16 outputted from the subtracter 8 is inputted intact to the other input terminal of the AND gate 97, and is inverted by an inverter 99 to be inputted to the other input terminal of the AND gate 98. The output of the AND gate 97 is inputted to one input terminal of a NOR gate 94, and to the other input terminal of the NOR gate 94, the control signal 24 outputted from the control circuit 88 is inputted. And the output of the NOR gate 94 is inverted by an inverter 91 and inputted to the first selector 87 as an input signal 25.

The output of the AND gate 98 is inputted to one input terminal of a NOR gate 95, and to the other input terminal of the NOR gate 95, the control signal 23 outputted from the control circuit 88 is inputted. And the output of the NOR gate 95 is inverted by an inverter 92 and inputted to the first selector 87 as the input signal 28.

Accordingly, when the control signal 24 indicating the first cycle of the decimal division is "1", the output of the NOR gate 94 becomes "0" regardless of the values of the control signals 22 and 16, and the output of the inverter 91, that is, the input signal 25 becomes "1". And when the control signal 23 indicating second and after second cycles of the decimal division is "1", the output of the NOR gate 95 becomes "0" regardless of the values of the control signals 22 and 16, and the output of the inverter 92, that is, the input signal 28 becomes "1".

On the other hand, when the control signal 24 is "0", since the function of the AND gate 97 and the NOR gate 94 equal to that of the NAND gate 64 shown in FIG. 10, the first selector 87 shown in FIG. 15 is operated in quite the same way as the first selector 37 shown in FIG. 10.

The operation of the first selector 87 having such a configuration is as follows.

In a hexadecimal division, since the control signals 21, 22, 23 indicate the division cycles in the same way as the aforesaid second invention, explanation on the case will be omitted.

In a decimal division, the control signal 24 indicates a first cycle of the decimal division, and the control signal 23 indicates second and after second cycles of the decimal division. Accordingly, during the decimal division is executed, the control signals 21 and 22 are held to be "0". When the control signal 24 is "1", the control signal 23 always "0", and only the input signal 25 becomes "1" regardless of a value of the control signal 16. Therefore, when the control signal 24 is "1", the respective transistors of the 3-bit right shift circuit 51 are on, and the respective bits of the mantissa data MA' are shifted to the right by three bits and outputted. When the control signal 24 is "0", the control signal 23 is always "1", and only the input signal 28 becomes "1" regardless of the value of the control signal 16. Therefore, when the control signal 24 is "0", the respective transistors of the latch output data through output circuit 54 are on and the respective bits of the output data from the latch 13 is through-outputted intact.

Figure 16:
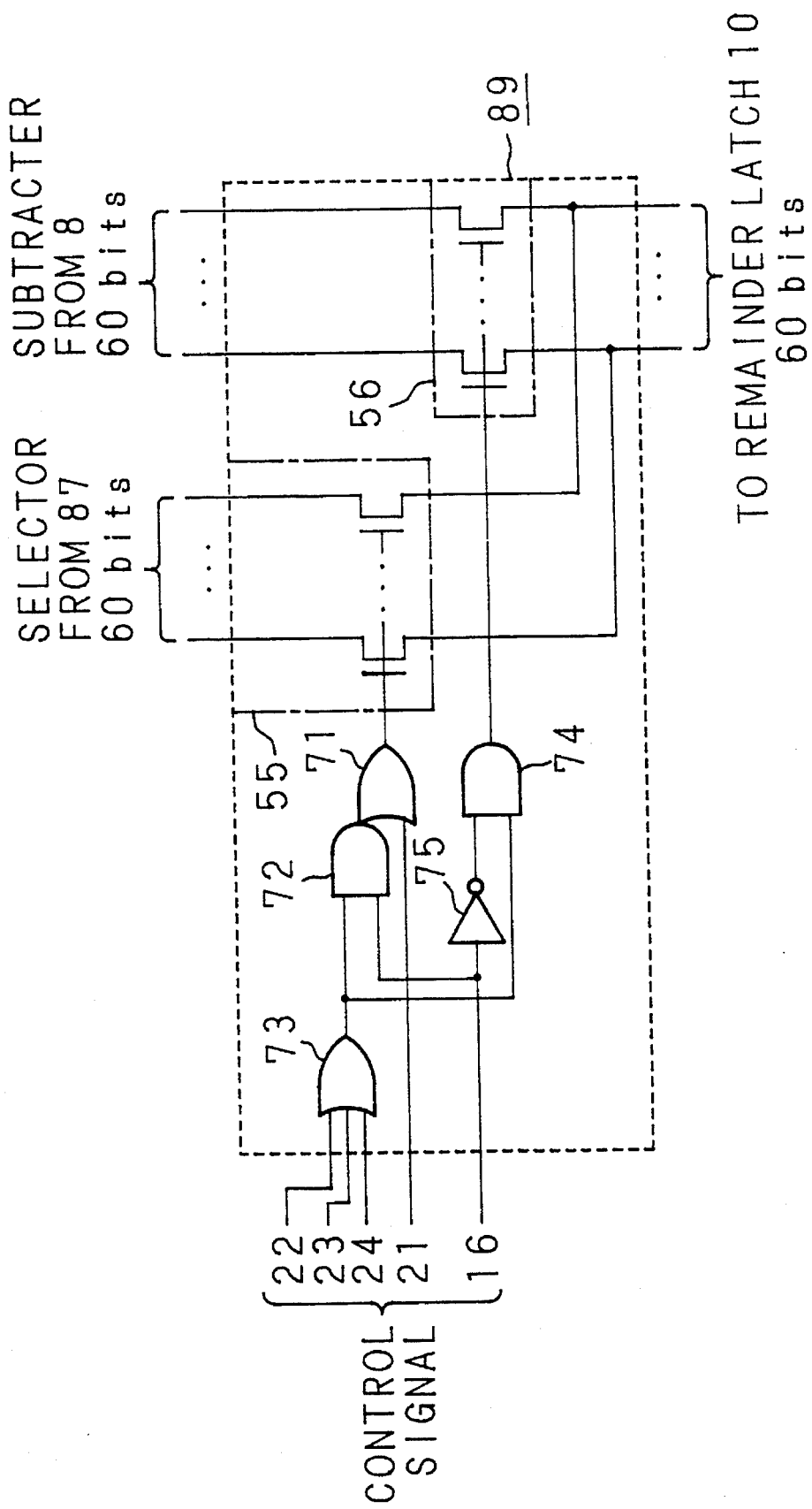
FIG. 16 is a circuit diagram showing a configuration example of a second selector of a third invention of a divider of the invention.

And it is all right for the second selector 89 to have a logical sum of the control signals 22, 23 and 24 by inputting the control signal 24 to the OR gate 730 instead of the OR gate 73 obtaining a logical sum between the control signals 22, 23 of the second selector 39 shown in FIG. 11. A concrete circuit diagram is shown in FIG. 16.

As aforementioned, the third invention of a divider of the invention can be utilized for not only a hexadecimal division but for a decimal division as well, by providing the control signal 24 indicating the decimal division cycle and the signal line 19 which transmits partial remainder data outputted from the remainder latch 10.

Since the present invention is so constructed as described in the above, it is so effective as follows.

Since the divider of the invention performs bit-alignment necessary to a hexadecimal division, by performing a hexadecimal normalized shift once before a division for mantissa data whose base is 16 and by selectively using a shifting function of data built in the selector and a through-outputting function, the division result can be determined only by repeating processings by predetermined number of times. Accordingly, a divider of the invention can improve the operation speed and reduce the quantity of the hardware configuration, because in addition to medium means such as a binary normalized shift, means for compensating bit shift caused in binary normalized shift becomes unnecessary.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A divider, comprising:

a control circuit for generating division cycle signals indicating a first cycle, a second cycle and at least a third cycle of a division respectively;

a first normalizing circuit for inputting a dividend data being floating point data whose base is 16, and for normalizing the dividend data on a basis of the base of the dividend data;

a second normalizing circuit for inputting a divisor data being floating point data whose base is 16, and for normalizing the divisor data on a basis of the base of the divisor data;

a selector for inputting a first data and the division cycle signals generated by said control circuit, and for performing an operation on the first data corresponding to the division cycle signals and then outputting the operated on first data; and a dividing circuit for inputting a second data and a third data, for comparing the second and third data with each other, and for calculating a quotient data and a remainder data from the second and third data;

wherein when the division cycle signals indicate the first cycle, said selector inputs a mantissa data of the dividend data from said first normalizing circuit as the first data to through-output the first data as the second data which is to be inputted to said dividing circuit, and said dividing circuit inputs the data outputted from said selector as the second data and a mantissa data of the divisor data outputted from said second normalizing circuit as the third data, and compares the second and third data, wherein when the division cycle signals indicate the second cycle, said selector, when a comparison result by said dividing circuit in said first cycle shows that the second data is larger than or equal to the third data, inputs the mantissa data of the dividend data from said first normalizing circuit as the first data to output the first data as the second data, which is to be inputted to said dividing circuit after shifting the first data to the right, and when the comparison result by said dividing circuit in said first cycle shows that the second data is smaller than the third data, inputs the mantissa data of the dividend data from said first normalizing circuit as the first data to output the first data as the second data which is to be inputted to said dividing circuit after shifting the first data to the left, and said dividing circuit inputs the data outputted from said selector as the second data and the mantissa data of the divisor data outputted from said second normalizing circuit as the third data, respectively, compares the second and third data, calculates the quotient data and the remainder data from the second and third data, and outputs said quotient data and said remainder data, and wherein when the division cycle signals indicate at least the third cycle, said selector inputs the remainder data outputted from said dividing circuit as the first data to through-output the first data as the second data which is to be inputted to said dividing circuit, and said dividing circuit inputs the remainder data outputted from said selector as the second data and mantissa data of divisor data outputted from said second normalizing circuit as the third data, respectively, compares the second and third data, calculates the quotient data and the remainder data and outputs said quotient data and said remainder data.

2. A divider as set forth in claim 1, wherein said selector comprises:

a first direct output circuit which through-outputs the output from said first normalizing circuit intact to said dividing circuit when a division cycle signal indicating the first cycle is given;

a right shift output circuit which shifts the output from said first normalizing circuit to the right and outputs the first data to said dividing circuit when a division cycle signal indicating the second division cycle, and a signal indicating that the comparison result by said dividing circuit shows that the second data is larger than or equal to the third data are given, a left shift output circuit which shifts the output from said first normalizing circuit to the left and outputs the first data to said dividing circuit when the division cycle signal indicating the second cycle, and the signal indicating that the comparison result by said dividing circuit shows that the second data is smaller than the third data are given; and a second direct output circuit which through-outputs the output from said dividing circuit intact to said dividing circuit when a division cycle signal indicating at least the third cycle is given.

3. A divider, comprising:

a control circuit for generating division cycle signals indicating a first cycle, a second cycle and at least a third cycle of a division respectively;

a first normalizing circuit for inputting a dividend data being floating point data whose base is 16, and for normalizing the dividend data on a basis of the base of the dividend data;

a second normalizing circuit for inputting a divisor data being floating point data whose base is 16, and for normalizing the divisor data on a basis of the base of the divisor data;

a first selector for inputting a first data and the division cycle signals generated by said control circuit, and performing an operation on the first data corresponding to the division cycle signals and then outputting the operated on first data; and a dividing circuit having a subtracter for inputting a second data and a third data, for comparing the second and third data with each other, and for calculating a quotient data and a remainder data from the second and third data, a second selector for selectively outputting either of the operated on first data or the remainder data obtained by said subtracter, and a 1-bit left shifter for shifting the data outputted from said second selector by one bit to the left and outputting the data after shifting; wherein when the division cycle signals indicate the first cycle,
said first selector inputs a mantissa data of the dividend data from said first normalizing circuit as the first data to through-output the first date as the second data which is to be inputted to said subtracter,
said subtracter inputs the data outputted from said first selector as the second data and a mantissa data of the divisor data outputted from said second normalizing circuit as the third data and compares the second and third data, and
said second selector selects the data outputted from said first selector, shifts the data 1-bit to the left by said 1-bit left shifter, and outputs the selected data after shifting, wherein when the division cycle signals indicate the second cycle, said first selector, when a comparison result by said subtracter in said first cycle shows that the second data is larger than or equal to the third data, inputs the mantissa data of the dividend data from said first normalizing circuit as the first data to output the first data as the second data, which is to be inputted to said subtracter after shifting the first data to the right, and when the comparison result by said subtracter in said first cycle shows that the second data is smaller than the third data, inputs the data shifted by one bit to the left by said 1-bit left shifter as the first data, outputs the first data as the second data which is to be inputted to said subtracter after shifting the first data to the left, said subtracter inputs the date outputted from said first selector as the second data and the mantissa data of the divisor data outputted from said second normalizing circuit as the third data, respectively, to compare the second and third data, calculates the quotient data and the remainder data from the second and third data and outputs said quotient data and said remainder data, and said second selector, when the comparison result by said subtracter in said second cycle shows that the second data is larger than or equal to the third data, selects the remainder data outputted from said subtracter, and when the comparison result by said subtracter in said second cycle shows that the second data is smaller than the third data, selects the second data, shifts the data 1-bit to the left by said 1-bit left shifter and outputs the selected data after shifting, and wherein when the division cycle signals indicate at least the third cycle, said first selector inputs the remainder data outputted from said 1-bit left shifter as the first data to through-output the first data as the second data which is to be inputted to said subtracter, and said subtracter inputs the remainder data outputted from said first selector as the second data and the mantissa data of the divisor data outputted from said second normalizing circuit as the third data, compares the second and third data, calculates the quotient data and the remainder data from the second and third data and outputs said quotient data and said remainder data.

4. A divider as set forth in claim 3, wherein said first selector comprises:

a first direct output circuit which through-outputs the output from said first normalizing circuit intact to said subtracter when a division cycle signal indicating the first cycle is given;

a right shift output circuit which shifts the output from said first normalizing circuit to the right and outputs the first data to said subtracter when a division cycle signal indicating the second cycle, and a signal indicating that the comparison result by said subtracter shows that the second data is larger than or equal to the third data are given, and a second direct output circuit which through-outputs the output from said 1-bit left shifter intact to said subtracter when a division cycle signal indicating at least the third cycle is given.

5. A divider, comprising:

a control circuit for generating division cycle signals indicating a first cycle, a second cycle and at least a third cycle of a hexadecimal division, and a first cycle and at least a second cycle of a decimal division respectively;

a first normalizing circuit for inputting a dividend data being floating point data whose base is 16, and for normalizing the dividend data on a basis of the base of the dividend data;

a second normalizing circuit for inputting a divisor data being floating point data whose base is 16, and for normalizing the divisor data on the basis of the base of the divisor data;

a first selector for inputting a first data and the division cycle signals generated by said control circuit, and for performing an operation on the first data corresponding to the division cycle signals and then outputting the operated on first data; and a dividing circuit having a subtracter for inputting a second data and a third data, for comparing the second and third data with each other, and for calculating a quotient data and a remainder data from the second and third data, a second selector for selectively outputting either of the operated on first data or the remainder data obtained by said subtracter, a 1-bit left shifter for shifting the data outputted from said second selector by one bit to the left and outputting the data after shifting, and a path for outputting the remainder data obtained by said subtracter to outside; wherein when the division cycle signals indicate the first cycle of hexadecimal division, said first selector inputs a mantissa data of the dividend data from said first normalizing circuit as the first data to through-output the first data as the second data which is to be inputted to said subtracter, said subtracter inputs the data outputted from said first selector as the second data and a mantissa data of the divisor data outputted from said second normalizing circuit as the third data and compares the second and third data, and said second selector selects the data outputted from said first selector shifts the data 1-bit to the left by said 1-bit left shifter, and outputs the selected data after shifting, wherein when the division cycle signals indicate the second cycle of hexadecimal division, said first selector, when a comparison result by said subtracter in said first cycle of hexadecimal division shows that the second data is larger than or equal to the third data, inputs the mantissa data of the dividend data from said first normalizing circuit as the first data to output the first data as the second data, which is to be inputted to said subtracter after shifting the first data to the right, and when the comparison result by said subtracter in said first cycle of hexadecimal division shows that the second data is smaller than the third data, inputs the data shifted by one bit to the left by said 1-bit left shifter as the first data to output the first data as the second data which is to be inputted to said subtracter after shifting the first data to the left, said subtracter inputs the data outputted from said first selector as the second data and the mantissa data of the divisor data outputted from said second normalizing circuit as the third data, respectively, to compare the second and third data, calculates the quotient data and the remainder data from the second and third data and outputs said quotient data and said remainder data, and said second selector, when the comparison result by said subtracter in said second cycle of hexadecimal division shows that the second data is larger than or equal to the third data, selects the remainder data outputted from said subtracter, an when the comparison result by said subtracter in said second cycle of hexadecimal division shows that the second data is smaller than the third data, selects the second data, shifts the data 1-bit to the left, by said 1-bit left shifter, and outputs the selected data after shifting, wherein when the division cycle signals indicate at least the third cycle of hexadecimal division, said first selector inputs the remainder data outputted from said 1-bit left shifter as the first data to through-output the first data as the second data which is to be inputted to said subtracter, and said subtracter inputs the remainder data outputted from said first selector as the second data and the mantissa data of the divisor data outputted from said second normalizing circuit as the third data, compares the second and third data, calculates the quotient data and the remainder data from the second and third data and outputs said quotient data and said remainder data, wherein when the division cycle signals indicate the first cycle of decimal division, said first selector inputs the mantissa data of the dividend data from said first normalizing circuit as the first data to output the first data as the second data which is to be inputted to said subtracter after shifting the first data to the right, said subtracter inputs the data outputted from said first selector as the second data and the mantissa data of the divisor data outputted from said second normalizing circuit as the third data, compares the second and third data, calculates the quotient data and the remainder data from the second and third data, and outputs said quotient data and said remainder data, and said second selector, when the comparison result by said subtracter in said first cycle of decimal division shows that the second data is larger than or equal to the third data, selects the remainder data obtained by said subtracter, shifts the data 1-bit to the left by said 1-bit left shifter, and outputs the selected data after shifting, an when the comparison result by said subtracter in said first cycle of decimal division shows that the second data is smaller than the third data, selects the data outputted from said first selector, shifts the data 1-bit to the left, by said 1-bit left shifter, and outputs the selected data after shifting, wherein when the division cycle signals indicate at least the second cycle of decimal division, said first selector inputs the remainder data outputted from said 1-bit left shifter as the first data to through-output the first data as the second data which is to be inputted to said subtracter, said subtracter inputs the data outputted from said first selector as the second data and the mantissa data of the divisor data outputted from said second normalizing circuit as the third data, compares the second and third data, calculates the quotient data and the remainder data from the second and third data, and outputs said quotient data and said remainder data, and said second selector, when the comparison result by said subtracter in said second cycle of decimal division shows that the second data is larger than or equal to the third data, selects the remainder data obtained by said subtracter, shifts the data 1-bit to the left by said 1-bit left shifter, and outputs the selected data after shifting, an when the comparison result by said subtracter in said second cycle of decimal division shows that the second data is smaller than the third data, selects the data outputted from said first selector, shifts the data 1-bit to the left by said 1-bit left shifter, and outputs the selected data after shifting, and wherein when the quotient data corresponding to one decimal digit is obtained at said at least second cycle of decimal division, said path outputs the remainder data obtained by said subtracter to the outside.

6. A divider as set forth in claim 5, wherein said first selector comprises:

a first direct output circuit which through-outputs the output from said first normalising circuit intact to said subtracter when a division cycle signal indicating the first cycle of hexadecimal division is given;

a right shift output circuit which shifts the output from said first normalizing circuit to the right and outputs the first data to said subtracter when a division cycle signal indicating the second cycle of hexadecimal division, and a signal indicating that the comparison result by said subtracter shows that the second data is larger than or equal to the third data are given, or a division cycle signal indicating the first cycle of decimal division is given, and a second direct output circuit which through-output the output from said 1-bit left shifter intact to said subtracter when a division cycle signal indicating at least the third cycle of hexadecimal division, or indicating at least the second cycle of decimal division is given.

* * * * *